US010885219B2

(12) United States Patent
Dotan-Cohen et al.

(10) Patent No.: US 10,885,219 B2
(45) Date of Patent: Jan. 5, 2021

(54) PRIVACY CONTROL OPERATION MODES

(71) Applicant: MICROSOFT TECHNOLOGY LICENSING, LLC, Redmond, WA (US)

(72) Inventors: Dikla Dotan-Cohen, Herzliya (IL); Haim Somech, Herzliya (IL); Hadas Bitran, Ramat Hasharon (IL); Ido Priness, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 193 days.

(21) Appl. No.: 15/431,432

(22) Filed: Feb. 13, 2017

(65) Prior Publication Data

US 2018/0232534 A1  Aug. 16, 2018

(51) Int. Cl.
*G06F 21/62* (2013.01)
*H04W 12/00* (2009.01)
(Continued)

(52) U.S. Cl.
CPC .... *G06F 21/6245* (2013.01); *H04W 12/0013* (2019.01); *G06F 21/53* (2013.01); *G06F 21/60* (2013.01); *G06F 2221/2111* (2013.01)

(58) Field of Classification Search
CPC .................. G06F 21/6245; G06F 2221/2111
See application file for complete search history.

(56) References Cited

U.S. PATENT DOCUMENTS 6,505,048 B1 * 1/2003 Moles ................... H04W 4/029
455/456.1
7,139,820 B1 * 11/2006 O'Toole ................ H04L 63/123
709/223
(Continued)

FOREIGN PATENT DOCUMENTS

WO  2015020534 A1  2/2015

OTHER PUBLICATIONS

Wightman, et al., "Evaluation of Location Obfuscation Techniques for Privacy in Location Based Information Systems", In Proceedings of IEEE Latin-American Conference on Communications, Oct. 24, 2011, 6 pages.
(Continued)

*Primary Examiner* — Harunur Rashid
(74) *Attorney, Agent, or Firm* — Shook, Hardy and Bacon, L.L.P.

(57) ABSTRACT

Technology is disclosed for improving user privacy and providing user control over user-activity data collected from personal computing devices (i.e., user devices). User devices may be configured to operate in a private mode that enables a user to control, for example, which aspects of user-activity data are provided to applications and services running on their user device; to obscure or modify aspects of user-activity data so that certain applications and services, which may require this information to operate, may still function, but that the obscured information provided to these applications and services preserves user privacy or no longer may be used to identify the user; or to remove evidence of user-activity data created, monitored, reported, or otherwise collected by or on the user device while the user is operating their user device in the private mode setting.

20 Claims, 9 Drawing Sheets

(51) Int. Cl.
*G06F 21/60* (2013.01)
*G06F 21/53* (2013.01)

(56) References Cited

U.S. PATENT DOCUMENTS

| | | | |
|---|---|---|---|
| 2009/0323972 | A1 | 12/2009 | Kohno et al. |
| 2010/0146301 | A1* | 6/2010 | Shevchenko ....... H04L 63/0407 713/193 |
| 2011/0138480 | A1* | 6/2011 | Janoulis ................. H04W 8/16 726/28 |
| 2012/0042046 | A1 | 2/2012 | Petersen et al. |
| 2012/0054853 | A1* | 3/2012 | Gupta ..................... G06F 21/53 726/17 |
| 2012/0192247 | A1* | 7/2012 | Oliver ................. G06F 21/6245 726/1 |
| 2015/0235043 | A1* | 8/2015 | Haik ................... G06F 21/6218 726/27 |
| 2015/0350890 | A1 | 12/2015 | Arunkumar et al. |
| 2016/0217292 | A1* | 7/2016 | Faaborg ................. G06F 21/60 |
| 2019/0182176 | A1* | 6/2019 | Niewczas ............. H04L 47/803 |

OTHER PUBLICATIONS

Walsh, et al., "Hiding on the road—Anonymous usage of Location Based Services", In Proceedings of 36th Annual IEEE Conference on Local Computer Networks, Oct. 4, 2011, pp. 67-75.

Wightman, et al., "Matlock: A location obfuscation technique for accuracy-restricted applications", In Proceedings of IEEE Wireless Communications and Networking Conference: Mobile and Wireless Networks, Apr. 1, 2012, pp. 1829-1834.

Quercia, et al., "SpotME If You Can: Randomized Responses for Location Obfuscation on Mobile Phones", In Proceedings of 31st International Conference on Distributed Computing Systems, Jun. 20, 2011, pp. 363-372.

Li, et al., "All Your Location are Belong to Us: Breaking Mobile Social Networks for Automated User Location Tracking", In Proceedings of Computing Research Repository, Oct. 2013, 14 pages.

Ardagna, et al., "An Obfuscation-Based Approach for Protecting Location Privacy", In Journal of IEEE Transactions pn Dependable and Secure Computing, vol. 8, Issue 1, Jan. 2011, pp. 1-16.

Zakhary, et al., "The quest for location-privacy in opportunistic mobile social networks", In Proceedings of 9th International Wireless Communications and Mobile Computing Conference, Jul. 1, 2013, 11 pages.

Shokri, et al., "Quantifying Location Privacy", In Proceedings of IEEE Symposium on Security and Privacy, May 22, 2011, 21 pages.

Hengartner, Urs, "Hiding Location Information from Location-Based Services", In Proceedings of International Conference on Mobile Data Management, May 1, 2007, 8 pages.

Brush, et al., "Exploring end user preferences for location obfuscation, location-based services, and the value of location", In Proceedings of the 12th ACM international conference on Ubiquitous computing, Sep. 26, 2010, pp. 95-104.

"International Search Report and Written Opinion Issued in PCT Application No. PCT/US18/016935", dated Apr. 6, 2018, 15 Pages.

* cited by examiner

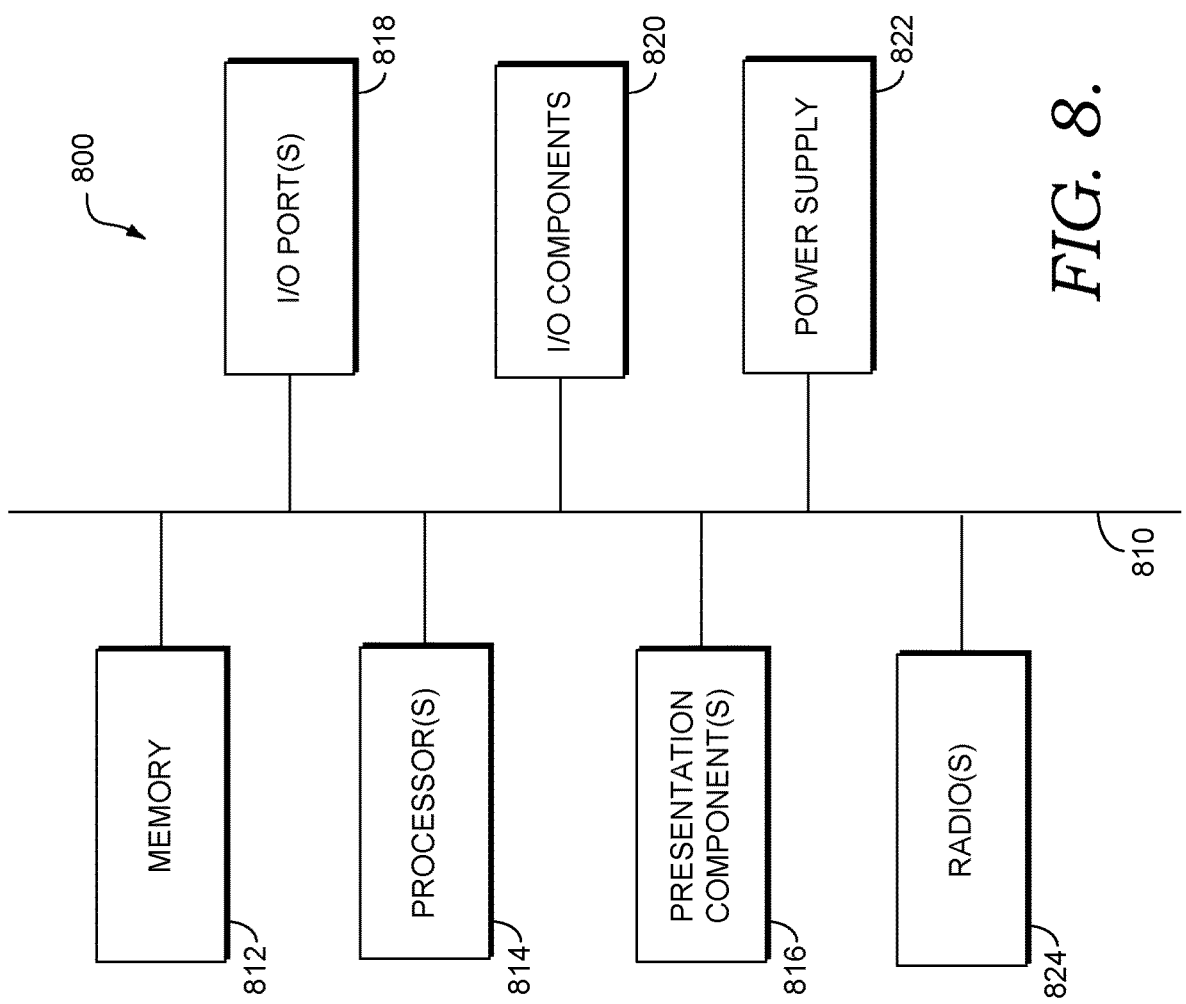

PRIVACY CONTROL OPERATION MODES

BACKGROUND

Personal computing devices, such as smartphones, and applications running on these devices, collect information about their users. For example, locations visited by a user, application usage, photos taken by the user, user search logs, user browsing history, user contacts, etc., and similar data generated by the user's activity may be monitored and collected, even when the user's data is not related to services provided by these applications. But many users desire some amount of privacy and control over how the applications and services running on their computing devices access and consume the personal data generated from their user activities. For example, there may be times when a user does not want to be tracked, monitored, or have this personal data collected and shared with third-party applications and services. Similarly, there may be times a user lends their mobile device to another person, but doesn't want data generated from that other person's activity to pollute their own personal data on their mobile device.

For those spans of time when a user desires this level of privacy and control, the user typically has three options. A first option is that the user can subsequently manually review and attempt to delete their user activity, communication logs, app installs, etc. But this option is cumbersome and difficult to achieve. It is likely that at least some breadcrumbs of information about the user generated during this time frame will still be left over. Moreover, some of the user's information will have been already collected by back-end servicers associated with the applications and services used during this time frame. A second option is for the user to selectively disable features on their personal computing device that can generate some of this personal user data, such as location detection (e.g., GPS). But many applications and services require such data in order to operate or will not function properly without this information. Finally, a third option is that the user can just leave their personal computing device at home. But this is not acceptable to most users. In particular, the user may want to continue enjoying the benefits of their computing device but still want to maintain privacy and control over any data generated from their activities.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving user privacy and providing user control over the user-activity related data collected from personal computing devices (sometimes referred to herein as mobile devices or user devices). In particular, embodiments provide various in-private modes of operation by a user device that may enable the user to control which user-activity related data is provided to applications and services running on their user device; to obscure or modify aspects of user-activity related data so that certain applications and services, which may require this information to operate, may still function, but that the obscured information provided to these applications and services preserves user privacy or no longer may be used to identify the user; or to remove evidence of user-activity related data created, monitored, reported, or otherwise collected by or on the user device while the user is operating their user device in the private mode setting. In some embodiments, hardware and/or software running on the user device, such as the operating system, provides an "in-private mode" (IPM) setting that may be selectively invoked by the user or automatically invoked, and may further include a user interface enabling a user to manage specific aspects of user-activity related data detected or observed by the user device. Further, in some embodiments, a user may selectively switch between IPM and normal mode in order to utilize applications and services in both environments near-simultaneously.

For example, and as will be further described herein, in one embodiment, a quarantine is created and utilized to support user operations within an IPM session. The quarantine may operate in a controlled environment similar to a virtual machine and include copies of applications and services already installed on the user device. Aspects of user-related activity provided to or generated in the quarantine may be controlled, based on user settings. Upon ending an IPM session, the quarantine, including user-activity related data generated within the IPM session, may be deleted from memory of the user device. Other user-activity related data generated on the user device also may be cleared or modified, based on user settings.

BRIEF DESCRIPTION OF THE DRAWINGS

Aspects of the disclosure are described in detail below with reference to the attached drawing figures, wherein:

FIG. 8 is a block diagram of an exemplary computing environment suitable for use in implementing an embodiment of the present disclosure.

DETAILED DESCRIPTION

Figure 1:
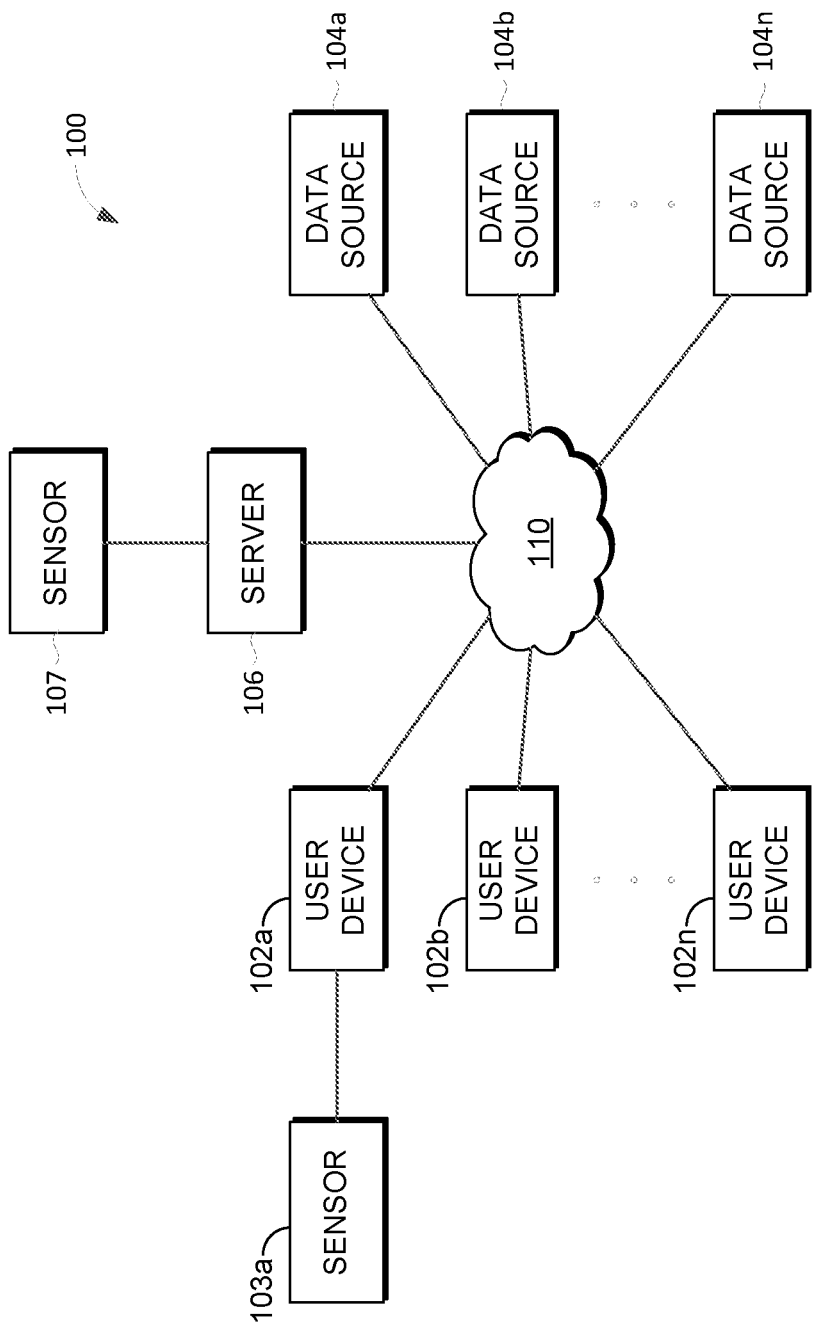
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for facilitating and improving user privacy and providing user control over the user-activity related data collected from personal computing devices (sometimes referred to herein as mobile devices or user devices). The coalescence of telecommunications and personal computing technologies in the modern era has enabled, for the first time in human history, information on demand combined with an ubiquity of personal computing resources (including mobile personal computing devices and cloud-computing coupled with communication networks). As a result, it is increasingly common for users to rely on one or more mobile computing devices throughout the day for handling various tasks. But as described previously, these user devices are nearly continuously collecting personal information about their users and often sharing that information with third-party applications and services. As such, the progression of these technologies has elevated concerns about user privacy.

Many users desire—at least at certain times or for certain situations—to have greater control over how this personal computing technology creates and utilizes data generated from their activities. But conventional approaches to handling a user's personal information—such as displaying notifications, obtaining user consent for collecting information, and letting the user choose between opting in fully or leaving their device at home—do not really address the privacy problems that are created by these technologies. Similarly, solutions where users delete their data breadcrumbs as they go are ineffective for the reasons described previously. Further, it is not feasible for a typical user of these technologies to know exactly what information is collected on his mobile computing device(s) and how that information is used; nor do these technologies enable their users to exercise granular control over their information, such as described herein. In particular, among other benefits, embodiments described herein improve privacy technology by enabling users to continue to enjoy the benefit of their mobile devices, but have control over how their information is collected or utilized in times they desire greater privacy or security.

Accordingly, solutions provided herein include technologies for addressing user privacy concerns and providing improved control over the user-activity related data collected from their mobile computing devices. In particular, some of these technologies facilitate in-private modes (IPMs) of operation of a user device. For example, hardware and/or software running on the mobile device may provide an IPM setting that a user can selectively invoke or may be invoked automatically or conditionally, and may further include a user interface enabling a user to manage specific aspects of user-activity related data detected or observed by the mobile device. The user-activity related data may include, for example and without limitation, location data (e.g., the location of the mobile device or location history); application (or "app") usage; app installation; communication such as incoming or outgoing calls, texts, emails, instant messages, etc.; user searches or search history; motion information such as accelerometric/gyroscopic information or motion derived from sensing changes in location information; physiological information (e.g., blood pressure or heart rate, which may be provided from a wearable mobile computing device); or other information related to the user's activity that is detectable or otherwise determinable using the user's mobile device.

As described previously, some embodiments of the described technology enable users to control which user-activity related data is provided to applications and services running on their user device. For instance, in some of these embodiments, a user may select specific aspects of user-activity related information (sometimes referred to herein as "channels" of user-activity related information), which may include types of user-activity related information (e.g., location, communications, application usage) and may also include data values, conditions, and/or other settings ("parameters") for the types of user-activity related information. In some embodiments, the channels of user-activity related data are controlled via user settings and a user interface, and may be controlled globally (i.e., global settings for all IPM sessions), within a specific IPM session, or both.

Similarly, some embodiments enable users to obscure or modify aspects of user-activity related data, such as by controlling channels and their parameters, so that certain applications and services, which may require user-activity related data to operate (or otherwise use the user-activity related data in the course of operation), are still able to operate, but use data determined from user-controlled channels. In this way, these applications and services continue to operate and be enjoyed by the user, but the information provided to these applications and services is controlled to preserve user privacy or obscure user identification.

By way of example and without limitation, a location channel may have parameters corresponding to aspects of location information, such as options about whether user-activity related data should indicate that the location of the mobile device is at a specific point of interest (POI), within a certain geographic area (e.g., geo-fenced), at a pseudorandom location or area, or a location (or area) previously visited by the user with the mobile device. Further, pseudorandom locations or areas may be generated by the mobile device and may have certain constraints, such as a valid location (e.g., not in the middle of a river, but somewhere believable or realistic for a person to be located). In some embodiments, these parameters may be determined and/or controlled by the user, may be set automatically (or have default values), or may be suggested by a service running on the mobile device. Further, in some embodiments, the parameters may include multiple settings and sub-settings; for instance, the example parameter designating that a location channel should indicate a particular location (or area) previously visited by a user may be further adjustable to indicate, for example, any area previously visited by the user, or a location (or area) corresponding to a user pattern. By way of example, if the user has a pattern of spending Saturday mornings in a park, and the IPM session occurs on a Saturday morning, then this example location channel may be set (by the user or automatically) to indicate that the mobile device is within the park.

Some embodiments of IPMs described herein facilitate enabling users to remove evidence of user-activity related data created, monitored, reported, or otherwise collected by or on the mobile device (or applications and services running in connection with the mobile device) while the user is operating their mobile device in the IPM setting. For example, user-activity related information generated during an IPM session may be limited or otherwise controlled, as described herein. Upon terminating an IPM session, the user-activity related data may be purged and/or aspects of the computing system of the user device may be restored to a state of the device as exiting prior to the IPM session. Additionally, in some embodiments, a replacement set of user-activity related data corresponding to the time span of the IPM session may be generated and used to fill the gap of the deleted user-activity related information (e.g., the data deleted upon ending the IPM session or data not collected in the first place while operating in IPM). The replacement data may be determined based on patterns of user activities observed when the user is in a normal mode of operation, which may be derived from user activity history previously collected by the mobile device. In this way, there is no hole (or absence) of user data that could otherwise indicate the user was operating in IPM.

In some embodiments of the described technology, an IPM session may be activated or controlled manually by a user (e.g., the user determines when to begin or end an IPM session.), controlled automatically, or a combination of both, based on conditions and/or user configurations. Automatic control of an IPM session may be based on rules, conditions, or other logic set by the user, such as time-based or location-based rules. For instance, a particular configuration may activate IPM operation: from 10:00 PM Saturday night to 3:00 AM Sunday morning; whenever the user visits a particular location, such as Las Vegas; whenever the user is in proximity with certain friends or other contacts; or based on other conditions.

Automatic control or activation of an IPM session also may be inferred from behavior patterns of the user. For example, suppose a particular user typically operates IPM at certain times, at certain locations, in the proximity of certain other people, or in other contexts or conditions. If current user data (which may be sensed by the mobile device) indicates the user is likely following a pattern of behavior where the user has previously operated IPM, then an IPM session may be activated automatically (or the user may be queried or prompted about starting an IPM session). In some embodiments, the data correlating user activity patterns and IPM session activation may include user data from outside of the IPM session (i.e., data monitored up to the start of an IPM session or after an IPM session). Further, in some embodiments so as to further preserve user privacy, this particular user data may be encrypted on the device or in the cloud.

Automatic control or activation of an IPM session for a particular user also may be inferred from patterns of other similar users, which may be determined by collecting de-identified (or otherwise unidentifiable) usage information. For example, where it is determined that a certain threshold number of other users activate IPM at or within proximity of a particular location or venue, then IPM may be activated (or suggested) for a particular user visiting that location or venue. In some embodiments, the threshold number may be based on a total count of de-identified users determined to have activated IPM (such as at least some number (e.g., fifty) of users have activated IPM), or a ratio of users (e.g., at least twenty percent of users activate IPM under this context or condition). Additionally, where IPM is started within proximity of a particular location, the proximity may be a fixed number (e.g., within 2 km) or may vary based on the particular location or venue. (In some embodiments, venue disambiguation may be used to determine a particular location visited by a user or set of similar users. For example, whether a user is at a coffee shop adjacent to a nightclub versus at the nightclub. The venue disambiguation also may consider a user's context and behavior patterns.)

In some embodiments, other aspects of IPM activation or operation, whether automatic or manual, are also configurable by a user. One example of such configuration includes IPM privacy sensitivity. For instance, in some embodiments, a user may configure the IPM sensitivity level or degree of privacy protection applied by IPM operation (e.g., which or how much user-activity related data is obscured, modified, or otherwise kept private and/or to what extent the user-activity related data is obscured or altered). The levels of sensitivity may be based on default settings or based on previous behavior patterns of the user or other users. In one embodiment, a slider, knob, wheel, dial, button, or similar graphical user interface (GUI) element may be provided as part of IPM settings and used to configure the sensitivity level. In this way, a user may easily tune or dial the sensitivity level by adjusting the GUI element. Further, sensitivity may be determined from a set of discrete or specific sensitivity levels (e.g., low, medium, high, extreme) or may be determined from a continuous scale or nearly continuous sensitivity spectrum of levels, such as from zero sensitivity or low sensitivity to maximum or extreme sensitivity.

Similarly, another configurable aspect of IPM operation, in some embodiments, includes the specific applications or services operating IPM, as described herein. In particular, in one example, users may configure a scope of IPM coverage, such as which applications or services (and/or which corresponding sensor data or other user-activity related data) are contained within IPM versus normal mode of operation. Users also may configure other specific aspects of IPM operation, such as a degree or extent of data modification or obfuscation, whether and how much and/or which user-activity related data is logged or made available to third parties, whether sensor or user-activity related data is received and sink-holed or whether sensors (or services that generate user-activity related data) are turned off completely. For example, one IPM configuration might enable true location data to be made available to applications or services running in the IPM, but prevent or block any logging of that location data (or any user-activity related data generated based on the location data). In configurations where sensor data is shut off completely, some applications or services, which use that sensor data, may not be able to function properly or at all. In some instances, applications and services that are not operating IPM will continue to function using real or unmodified sensor data (or other user-activity related data) and may also generate additional user-activity related data, which may be stored and/or made available to third parties.

As described above, in one embodiment, a quarantine is created and utilized to support user operations within an IPM session. The quarantine may operate in a controlled environment similar to a virtual machine and include copies of applications and services already installed on the mobile device. Aspects of user-related activity provided to or generated in the quarantine may be controlled, based on user settings. For instance, in an embodiment, a sensor-data handler and/or an application handling layer are utilized as abstraction layers of the mobile device computing system. The sensor-data handler may alter data (such as location data) detected by one or more sensors associated with the mobile device, and the application handling layer may control data requests and certain aspects of operations carried out by applications or services running on the mobile device, as further described herein, such as reading/writing data logs, communicating with back-end servers, or monitoring. In this way, using the IPM settings, a user may control the various channels of user-activity related data generated or utilized by applications and services running during the IPM session, and control certain aspects of the activity of these applications and services, such as their ability to sync up with back-end support servers or how they access user-related data on the mobile device.

Some embodiments enable a user to near-simultaneously utilize applications and services on their mobile device in both the regular environment and private mode environment. For example, a user could be engaged in two text message conversations: one in the regular or normal mode of operation (i.e., not IPM) using the user's name (or primary user ID, a phone number, etc.) and another text conversation in IPM using a private name or private user ID (which may be the same as the normal mode, but aspects of the communication occurring in IPM, such as logs of the conversation, are controlled.) Similarly, in some embodiments, a user may selectively switch between IPM and normal mode, to utilize applications and services in both environments.

Upon ending an IPM session, the quarantine, including user-activity related data generated during the IPM session, may be fully erased from memory of the user device, and other user history generated on the mobile device also may be cleared or modified, based on user settings or preferences. In some embodiments, a user may be notified that user-activity data, which may include user-created content, will be deleted upon terminating an IPM session. However, some embodiments may enable a user to selectively preserve aspects of user-activity related information. For example, a user interface may enable a user to select aspects of user-activity related information to preserve, including specific data such as content (e.g., a photo) created by the user in the IPM session or types of user-related activity, such as all texts or pictures generated during the IPM session. In one embodiment, the user-activity related information to be preserved may be transferred to a cloud-storage (e.g., a server) account corresponding to the IPM user ID or other server storage. In another embodiment, the user-activity related information to be preserved may be copied to outside of the IPM session supporting environment (e.g., a quarantine or virtual machine).

It should be noted that the term "in-private mode" used for some of the embodiments described herein is different than another feature found on some mobile device operating systems called "private mode." This other private mode feature works by merely hiding some user data (such as pictures or videos a user desires to keep private) that is created or stored on the device while the private mode setting is on. This concealed data is preserved (i.e., stored) on the device and may be accessed again each time the user turns on the "private mode" setting. Furthermore, this private mode feature does not control aspects of user-activity related data generated or collected by applications and services operating on the user device while the private mode setting is "on," nor does this feature provide the user with any control over how such user-activity related data is used by these applications and services.

It also should be noted that a goal of many of the embodiments described herein is to control aspects of the user's activity-related information collected by applications and services running on the mobile device, or otherwise visible or detectable on the mobile device. These embodiments, however, remain compliant with certain technologies employed by cellular providers or law enforcement for tracking, such as location tracking by a physical cell (i.e., cellular base transceiver station).

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Data sources 104*a* and 104*b* through 104*n* may comprise data sources and/or data systems, which are configured to make data available to any of the various constituents of operating environment 100, or system 200 described in connection to FIG. 2. (For instance, in one embodiment, one or more data sources 104*a* through 104*n* provide (or make available for accessing) user data, which may include user-activity related data, to user-data collection component 210 of FIG. 2.) Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* through 104*n* comprise one or more sensors, which may be integrated into or associated with one or more of the user device(s) 102*a*, 102*b*, or 102*n* or server 106. Examples of sensed user data made available by data sources 104*a* through 104*n* are described further in connection to user-data collection component 210 of FIG. 2.

Figure 2:
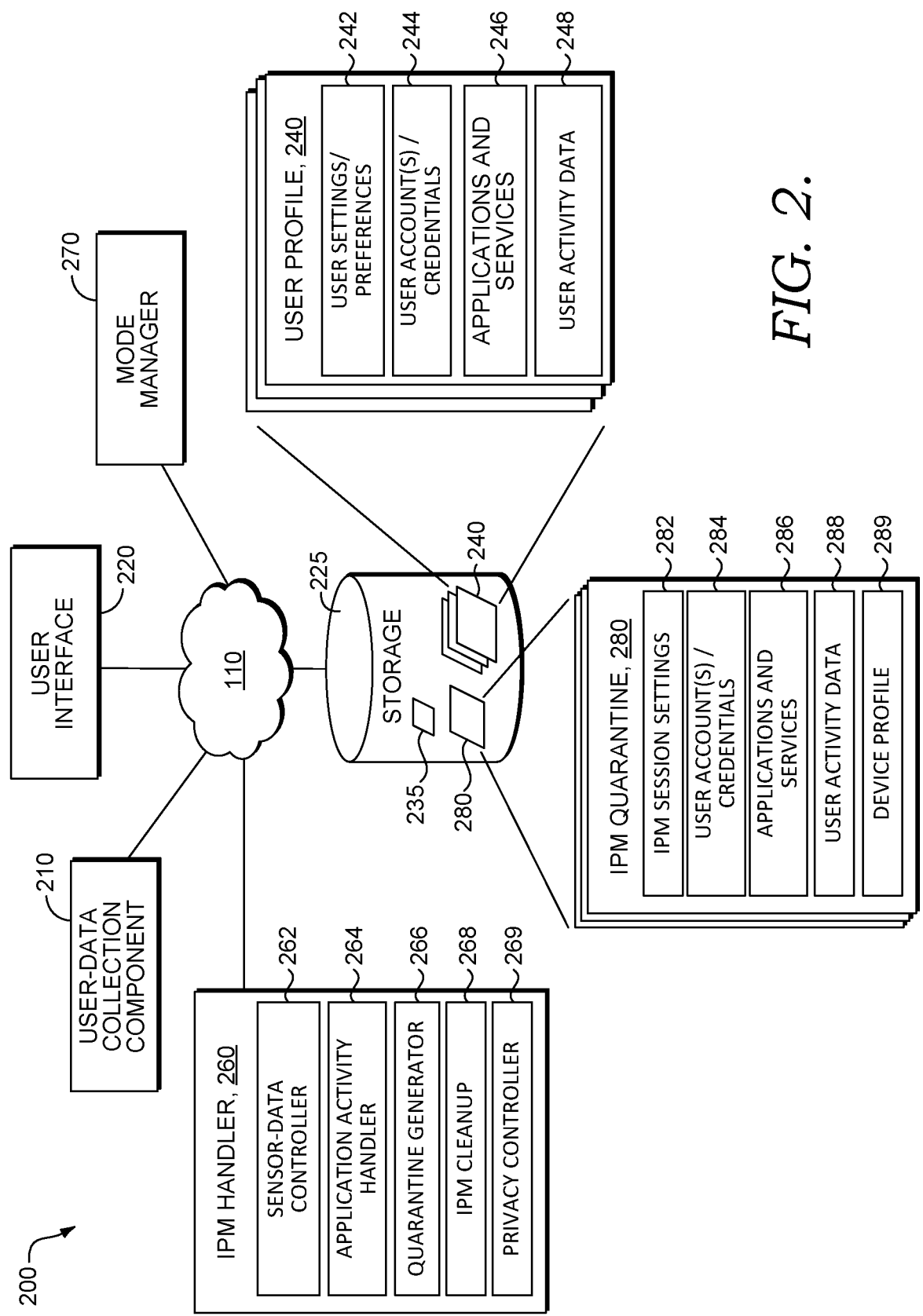
FIG. 2 is a block diagram depicting an example computing architecture suitable for implementing aspects of the present disclosure.

Operating environment 100 can be utilized to implement one or more of the components of system 200, described in FIG. 2, including components for collecting user data; monitoring or determining user tasks, user activity and events, user patterns (e.g., (usage, behavior, or activity patterns), user preferences, context data, or related information to facilitate sharing context or to otherwise provide an improved user experience; generating personalized content; and/or presenting notifications and related content to users. Operating environment 100 also can be utilized for implementing aspects of methods 600 or 700 in FIGS. 6-7, respectively.

Referring now to FIG. 2, with FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, user interface 220, in-private mode (IPM) handler 260, mode manager 270, and storage 225. Aspects of user-data collection component 210, mode manager 270, IPM handler 260, and user interface 220 may be embodied as a set of compiled computer instructions or functions, program modules, computer software services, or an arrangement of processes carried out on one or more computer systems, such as computing device 800 described in connection to FIG. 8, for example.

In one embodiment, the functions performed by components of system 200 are associated with one or more personal assistant applications, services, or routines. In particular, such applications, services, or routines may operate on one or more user devices (such as user device 102*a*), servers (such as server 106), may be distributed across one or more user devices and servers, or be implemented in the cloud. Moreover, in some embodiments, these components of system 200 (including one or more of components 210, 260, 270, 225, or aspects of 220) may be distributed across a network, including one or more servers (such as server 106) and/or client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104*a* and 104*b* through 104*n* of FIG. 1. In some embodiments, user-data collection component 210 may be employed to facilitate the accumulation of user data of a particular user (or in some cases, a plurality of users including crowdsourced data) for IPM handler 260, other components or subcomponents of system 200, and/or various applications or services associated with one or more user device(s). The data may be received (or accessed), and optionally accumulated, reformatted, and/or combined, by user-data collection component 210 and stored in one or more data stores such as storage 225, where it may be available to the components or subcomponents of system 200. For example, the user data may be stored in or associated with a user profile 240 or IPM quarantine 280, as described herein. In some embodiments, any personally identifying data (i.e., user data that specifically identifies particular users) is either not uploaded from the one or more data sources with the user data, is not permanently stored, and/or is not made available to the components or subcomponents of system 200.

User data may be received from a variety of sources where the data may be available in a variety of formats. For example, in some embodiments, user data received via user-data collection component 210 may be determined via one or more sensors (such as sensors 103*a* and 107 of FIG. 1), which may be on or associated with one or more user devices (such as user device 102*a* of FIG. 1 or device 401 of FIG. 4), servers (such as server 106 of FIG. 1), and/or other computing devices. As used herein, a sensor may include a function, routine, component, or combination thereof for sensing, detecting, or otherwise obtaining information, such as user data, from a data source 104*a*, and may be embodied as hardware, software, or both. By way of example and not limitation, user data may include data that is sensed or determined from one or more sensors (referred to herein as sensor data), such as location information of mobile device(s), mobile-device data (such as device state, charging data, date/time, configurations or settings, or other information derived from a mobile device), user-activity information (for example: app usage data (which may include app installation/uninstallation); information regarding applications and services utilized or tasks performed on a user device and related contextual information such as usage time(s), files accessed, application configurations, online activity; searches; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data (including smart appliances, smarthome digital assistants, and hubs), global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data, particularly in the form of contextual information, can be received by user-data collection component 210 from one or more sensors and/or computing devices associated with a user. In some embodiments, user-data collection component 210, IPM handler 260 (or one or more of its subcomponents), or other components of system 200 may determine interpretive data from received user data. Interpretive data corresponds to data utilized by the components or subcomponents of system 200 that comprises an interpretation from processing raw data. For example, interpretive data can be used to provide context to user data, which can support determinations or inferences carried out by components of system 200. Moreover, it is contemplated that some embodiments of the disclosure use user data alone or in combination with interpretive data for carrying out the objectives of the subcomponents described herein. It is also contemplated that some user data may be processed, by the sensors or other subcomponents of user-data collection component 210 not shown, such as for interpretability by user-data collection component 210. However, embodiments described herein do not limit the user data to processed data and may include raw data or a combination, as described above.

In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, or as needed.

IPM handler 260 is generally responsible for handling in-private modes of operation associated with a user device. For example, an IPM setting for a user device may be provided that a user can selectively invoke. Embodiments of IPM handler 260 control aspects of user-activity related data that is created, monitored, reported, collected by, or otherwise provided to applications or services associated with a mobile device while a user is operating the mobile device in the IPM setting. For example, IPM handler 260 may facilitate modifying or obscuring aspects of user-activity related data; controlling access by applications or services to user-activity related data; controlling how the user-activity related data is generated, utilized, and stored; and/or deleting user-activity related data when terminating an IPM session. In some embodiments, IPM handler 260 generates and utilizes (and in some instances also deletes) a quarantine, such as IPM quarantine 280, to support user options for an IPM session.

As shown in example system 200, IPM handler 260 comprises a sensor-data controller 262, an application activity handler 264, a quarantine generator 266, IPM cleanup component 268, and a privacy controller 269. Sensor-data controller 262 controls aspects of user-data collection and generation, including data provided by user-data collection component 210. For example, some embodiments of sensor-data controller 262 intercept (or otherwise receive) the data provided by user-data collection component 210 and may further control the data, such as by modifying, rerouting, blocking, or otherwise manipulating the data. In some embodiments, sensor-data controller 262 functions in part as (or operates in conjunction with) an abstraction layer between a hardware (or sensors) layer and operating system layer, such as IPM sensor data handler 320 described in connection with FIG. 3.

Figure 3:
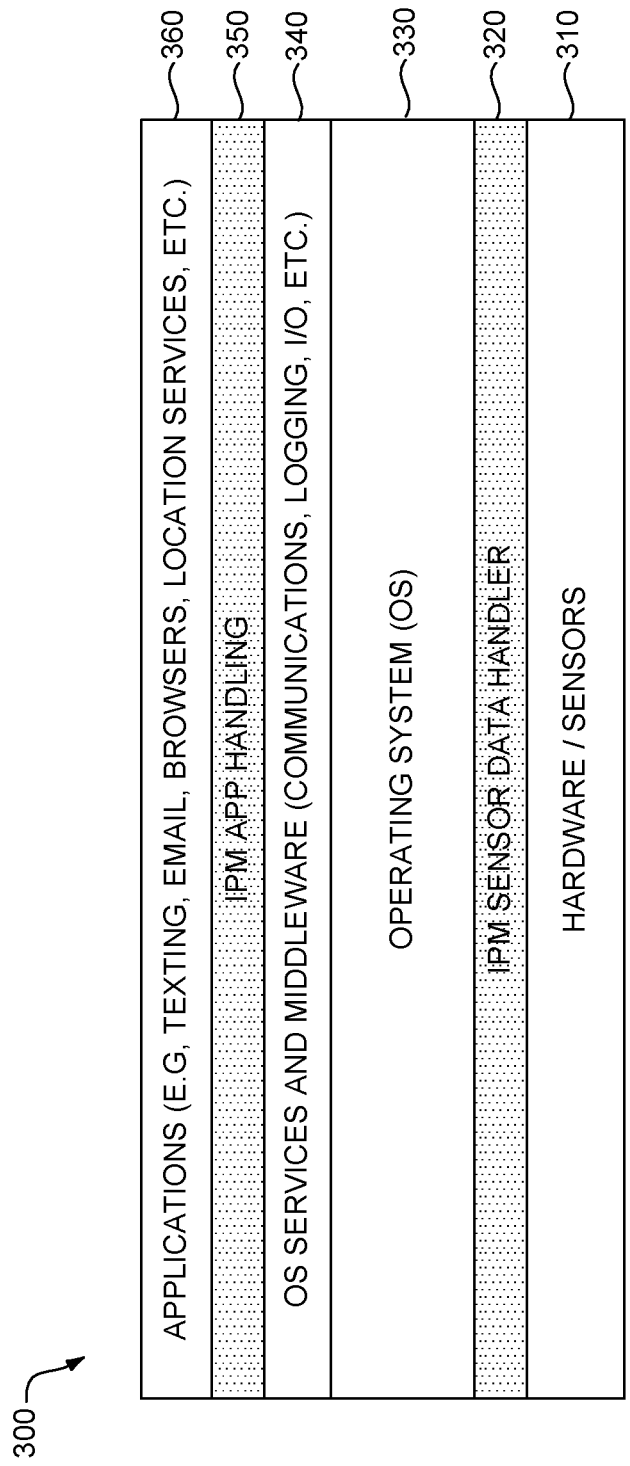
FIG. 3 illustratively depicts aspects of abstraction layers for a modified computing system suitable for implementing an embodiment of the present disclosure.

Turning briefly to FIG. 3, aspects of abstraction layers 300 for a computing system are illustratively depicted. The computing system is one example of a computing system that may be utilized by some embodiments of the present disclosure. As shown in FIG. 3, abstraction layers 300 include hardware/sensors layer 310, IPM sensor data handler 320, operating system (OS) layer 330, OS services and middleware layer 340, IPM app handling layer 350, and applications layer 360. OS services and middleware layer 340 may include an OS service used for communication, data logging, input/output functions, etc., which generally utilize more basic OS functionalities, which are provided by OS layer 330. Applications layer 360 may include applications (or higher level services, in some instances) such as communication apps (e.g., texting, email, calling), browsers, location services, navigation, or the like.

Layers 310, 330, 340, and 360 are abstraction layers commonly utilized by typical computing systems. Layers 320 and 350, which are provided in some embodiments of the present disclosure, are unconventional abstraction layers. As described herein, IPM sensor data handler 320 may be implemented via sensor-data controller 262 or other functionality carried out by IPM handler 260. In some embodiments, IPM sensor data handler 320 resides between hardware/sensors layer 310 and OS layer 330 to intercept and control (and in some instances modify) user-activity related data generated from hardware/sensors layer 310. In this way, OS layer 330 or other higher level layers receive controlled user data.

IPM app handling layer 350 may be implemented via application activity handler 264 (described below) or other functionality carried out by IPM handler 260. IPM app handling layer 350 resides between OS services and middleware layer 340 (or more generally OS layer 330) and applications layer 360 to manage calls or requests by applications layer 360 to lower level layers while the computer system is running in a private mode setting. For example, as further described in connection with application activity handler 264, IPM app handling layer 350 may control aspects of how the user-activity related data is utilized by the applications and services residing in applications layer 360.

Returning to FIG. 2, the user data may be controlled according to settings, which may indicate specific aspects of the user data to be controlled, and which may be specified in user settings/preferences 242 (in user profile 240) or IPM session settings 282 (in IPM quarantine 280), for example. (Some embodiments enable selective control of the user data, according to the settings, which may be configured via privacy controller 269, as described herein.) In some embodiments, the user data may be controlled by altering the values of specific types of user data, which may be performed to de-identify or obscure the data (i.e., to prevent user identification from the data) or otherwise preserve user privacy. For example, the values of location information indicating that a user device is at a particular location (which may be determined from a GPS sensor) may be modified so as to indicate a different location. Similarly, the user data may be modified (or controlled) to indicate the user is located within an area rather than a specific location.

In some embodiments, sensor-data controller 262 also determines how to modify (or otherwise control) the data according to the settings, and may utilize user-data control logic 235 to do so. User-data control logic 235 may include rules, associations, conditions, prediction and/or classification models, or pattern inference algorithms. The user-data control logic 235 can take many different forms depending on the particular user data or settings. For example, some embodiments of user-data control logic 235 may employ machine-learning mechanisms to determine patterns of user-related activity, which may be used for controlling user data values (e.g., altering the user's location to another location that the user is known to visit), or other statistical measures that support controlling the user data. For instance, continuing with the location example, altering the user's location to another location where people frequently visit, such as a popular mall or park. In this way, in some embodiments where user data is altered, the data may be modified to an alternative value that is realistic with regard to the user or is a likely location with regard to the user. For instance, if the location of the user is altered, then the modified location may be in an area where people are typically physically located (such as a park or mall) rather than in the middle of a river or the ocean. Similarly, the altered location may be a location the user is likely to visit during that time, based on a pattern of user activity determined from user activity data 248, which may be collected during normal (non IPM) modes of operation.

Although it is contemplated that some embodiments may not include a sensor-data controller 262 as described above, and may instead utilize uncontrolled or unmodified user data, advantages including increased user privacy and control are provided by embodiments having the functionality of sensor-data controller 262. For example, in those embodiments utilizing an IPM quarantine, merely deleting the quarantine after the IPM session does not necessarily preserve user privacy or provide control over the spread of user-activity related data associated with the IPM session. In particular, some applications and services used during the IPM session may reside in the cloud, may be distributed across the user device and one or more servers, or may otherwise communicate with a server. Thus, user-activity related data associated with the IPM session may be provided to a third-party server in the course of the IPM session. A user desiring greater control over their privacy may therefore prefer an embodiment that includes functionality provided by the sensor-data controller 262 to modify their user-activity related data.

Application activity handler 264 is generally responsible for managing aspects of user-activity related data for applications and services operating during an IPM session. In particular, embodiments of application activity handler 264 control user-activity related data accessed, generated, or provided by the applications and services in the IPM session. For example, application activity handler 264 may monitor application usage, installations and related services, such as data communications or data read/write requests to identify events that involve user-activity related data. Application activity handler 264 then controls aspects of how the user-activity related data is utilized by the applications and services. For instance, in some embodiments, application activity handler 264 manages aspects of the utilization of the user-activity related data based on particular features identified in the data (e.g., particular types of user-activity related data, such as location data) and based on user settings (which may be specified in user settings/preferences 242 or IPM session settings 282). Some embodiments of application activity handler 264 operate in conjunction with sensor-data controller 262 to control aspects of user-activity-related data during an IPM session. Further, some embodiments of application activity handler 264 function as or employ an abstraction layer between operating system services and middleware layer and applications layer, such as IPM app handling layer 350 described in connection with FIG. 3.

By way of example, in one embodiment, application activity handler 264 may intercept or block calls (i.e., requests or function invocations) to certain operating system (OS) services regarding user-activity related data. For instance, application activity handler 264 may identify an app running during an IPM session that requests to communicate with a back-end server to report app usage or may attempt to send other user-activity related data, such as search queries or browser history, to a server. Application activity handler 264 may intercept the request to the OS services associated with this activity and block (e.g., delete or sinkhole), modify, or otherwise control the activity. In some embodiments, application activity handler 264 may provide information to user interface 220 so that the user can be notified that a particular application is requesting to send their user-activity related data to a server. In some instances, the user then may decide to reconfigure permissions in their settings so as to enable or block the request. Similarly, application activity handler 264 may notify a user (via user interface 220) of back-end communications of user-activity related data even where a user has configured their settings to allow the communications. Still further, in another example, a user may be prompted (via application activity handler 264 and user interface 220) about an incoming or outgoing communication, such as a call or text, and asked whether or not the user desires to make the call "private" (i.e., whether to control the user-activity related data generated as a result of the communication). It may be noted that, despite the privacy features provided by embodiments described herein, in certain situations, such as the previous example, the mobile device of the other party to the communication may log information about the communication that identifies the present user.

As previously described, some embodiments of application activity handler 264 operate with sensor-data controller 262. For example, upon detecting a particular request or function by an application involving user-activity related data, application activity handler 264 may invoke sensor-data controller 262 such that the user-activity related data may be utilized by the application, but under the control of sensor-data controller 262. For instance, the user-activity related data may be modified such as described herein. In some embodiments, where application activity handler 264 detects activity by the applications or services that involve logging user activity, application activity handler 264 may block the recording or storage of the data to be logged (such as by deleting or sink-holing the stream of data being logged), or may redirect the storage of the data to a location in memory having controlled access or that can be deleted upon termination of the IPM session, such as memory associated with a quarantine.

Quarantine generator 266 is generally responsible for configuring the user device to support an IPM session upon the user starting the IPM session. In some embodiments, quarantine generator 266 (or more generally IPM handler 260) allocates a portion of computer system resources on the user device to support an IPM session environment. The portion of resources may include a portion of computer system memory, and the IPM session environment may be isolated from the operating environment that supports the normal mode of operation. For example, the IPM session environment may be isolated by running as (or inside of) a virtual machine that operates on the normal operating environment, as described herein. In some embodiments, the IPM session environment may be referred to as an IPM quarantine. Thus, in some embodiments, quarantine generator 266 may create an IPM quarantine upon the initiation of the IPM session, where the IPM quarantine, such as example IPM quarantine 280 (described below), may be utilized by IPM handler 260 to support user operations within an IPM session. In some embodiments, IPM quarantine 280 may be created in a manner similar to creating a virtual machine on a computing system. For instance, quarantine generator 266 may determine a portion of memory (either on the user device or in the cloud) for the quarantine and install onto the memory a hardware profile or user-device profile, logical storage structure, operating system, and applications and services. In some embodiments, the applications and services may include some or all of the same applications or services already installed on the user device. For example, the quarantine generator 266 may replicate the state of the user device, or may include in the newly created quarantine 280 a portion of the same applications already installed on the user device. In some embodiments, the user may configure which applications are installed in the quarantine 280 via IPM session settings 282 or user settings/preferences 242.

In particular, in some embodiments, aspects of the quarantine may be configured according to user settings, which may be global and/or local. For instance, in embodiments using global settings, the settings may be specified in user settings/preferences 242 (within user profile 240) and may apply to all quarantines or to all instances of IPMs of operation conducted on the user device. For embodiments using local settings, the settings may be specified in IPM session settings 282 of IPM quarantine 280, and may apply within a particular IPM session. Further, in some embodiments, IPM session settings 282 may be deleted (cleared) upon terminating the IPM session. Thus, there is no lasting evidence of these settings on the user device, and further, these settings may not apply for future IPM sessions. It is also contemplated that some settings (global or local) may be stored in the cloud and may be temporary (i.e., deleted upon terminating an IPM session) or persistent (i.e., capable of applying to multiple IPM sessions). For example, these settings may be stored in an online account associated with the IPM user ID or an account maintained by the user.

By way of example, global or local settings may include, without limitation, settings regarding which applications or services are to be installed in the quarantine (i.e., settings controlling the scope of IPM operation); specific privacy settings or permissions for these applications or services (e.g., whether a particular application is allowed to access certain user-activity related data or allowed to engage in communication with online services or other parties, such as described previously); other aspects of control over user-activity related data, as described above (e.g., channel and parameter settings, such as described herein; whether and how specific types of data should be modified or de-identified; whether certain data should be deleted, sink-holed, cleared, etc., upon termination of the IPM session; whether replacement data is to be used to cover data deleted from an IPM session; or other examples of controlling user-activity related data described herein); information about user account(s) associated with IPM session(s), which may be used by the applications or services in the quarantine; virtual private network (VPN) settings, proxy settings, and/or IP-calling settings to be applied for an IPM session, which may further enhance user privacy; encryption settings; notification settings specifying what events lead to user notification; whether the quarantine memory (or portions of user-activity related data generated within an IPM session) is stored locally or in the cloud (where it may be deleted upon ending the IPM session), such as on an account associated with the IPM session; or other settings or preferences described herein and in particular described in connection to IPM session settings 282 or user settings/ preferences 242. In some embodiments, a user configures IPM session settings 282 or user settings/preferences 242 via user interface 220 and privacy controller 269, as further described below. Still further, some settings may be set by default and/or may not be configurable by a user.

Accordingly, in one embodiment, quarantine generator 266 may initially generate a quarantine based on global settings, which may be specified in user settings/preferences 242. Once the quarantine is created, then the user may be provided an option (or may be prompted) to further configure the quarantine (or IPM session) by configuring local settings, which may be specified in IPM session settings 282. For example, the user may be prompted to provide a location channel setting specifying how the user-related activity location data should be controlled during the IPM session. (For instance, should the user's location be modified to indicate the user is within a geographic area.) Further, in some embodiments, some local settings may be reconfigured within the IPM session. For instance, a user may desire to change how an application uses user-activity related data generated during the IPM session.

Additionally, in some embodiments, quarantine generator 266 may create, solicit from the user, or access from user settings a private user ID for use during the IPM session. The user ID may comprise a name and/or account information associated with the user, such as a Microsoft® account, Google® account, or similar identity. In some instances, the private user ID is the same as the normal user ID; and in some instances it may be different, and may be determined based on user settings. In embodiments where it is created, the private user ID may be randomly created or a suggestion may be provided to the user. In some embodiments, a user may have certain settings associated with multiple, different private user IDs so that aspects of the quarantine (or IPM session) are further configured based on the particular private user ID provided or specified by the user.

In some embodiments, quarantine generator 266 may generate (according to settings) a quarantine that replicates the state of the user device. In other embodiments, quarantine generator 266 may generate a quarantine that has a hardware profile and/or OS that is different than the user device hardware or OS (similar to creating a virtual machine that is configured to be a different type of computer system or OS than the device or OS that is supporting the virtual machine). Additionally, in some embodiments, upon starting an IPM session, quarantine generator 266 (or another subcomponent of IPM handler 260 or system 200) stores in memory aspects of the pre-IPM state of the user device. In this way, upon termination of the IPM session (or in some instances, upon switching modes from IPM to normal mode), the pre-IPM state information can be reloaded and thus the state of the user device restored (at least partially) to the pre-IPM session state.

IPM cleanup component 268 is generally responsible for removing, deleting, or controlling aspects of user-activity related data generated in connection with an IPM session. For example, as described above, during an IPM session or upon terminating an IPM session, aspects of user-activity related data may be deleted or otherwise controlled so as to preserve user privacy and/or facilitate user control of the user's data. In some embodiments that utilize a quarantine 280, IPM cleanup component 268 is responsible for deleting from memory the quarantine 280. Further, prior to or following deletion of IPM-related data (which may include a quarantine 280), IPM cleanup component 268 also may carry out one or more cleanup services.

For example, IPM cleanup component 268 may first uninstall applications installed during the IPM session. By uninstalling the apps first, rather than simply deleting the quarantine 280, an online service, such as an app store or application manager, will not try to reinstall the apps upon the user connecting to the app store or application manager. Nor is the user likely to receive recommendations in the app store (or targeted ads) based on those applications when in the normal mode of operation. (For instance, some technologies will use a log of user-installed applications so that these applications may be automatically reinstalled/repopulated onto a new user device or restored user device.) In some embodiments, IPM cleanup component 268 may uninstall applications (or deregister services or accounts) prior to ending an IPM session or may do so after a period of time has elapsed.

Additional cleanup services may include, without limitation, uninstalling or deregistering applications, services, profiles, or accounts associated with the IPM session; deleting logs or other user data that may otherwise not be deleted upon terminating the IPM session and clearing memory associated with the IPM session (for instance, by deleting a quarantine 280 used in an IPM session); restoring aspects of the state of the user device to the state prior to the IPM session (as described herein); or other services that facilitate removing indications of an IPM session, removing or controlling (e.g., modifying) user data generated in connection with an IPM session, or restoring a user device to a normal mode of operation from IPM so as to preserve user privacy regarding user activities carried out during the IPM session.

For instance, one example cleanup service may facilitate generating replacement user data to fill holes created from deleting user data associated with the IPM session. The replacement data may be generic (i.e., not specific to the particular user), may be generated based on crowdsourced information obtained from other users, or may be generated based on a pattern of user activities observed when the user in the normal mode of operation, which may be derived from user activity history or logs previously collected by the mobile device.

In some embodiments, other user-activity related data generated on the user device also may be cleared, modified, or otherwise controlled (or the user may be provided with this option) based on user settings, by IPM cleanup component 268. In particular, it is contemplated that some embodiments may utilize the functionality of IPM handler 260 to manage user-related activity generated over the course of the normal mode of operation of the user device. As described above, it is difficult for a typical user to know or control how the applications and services operating on their user device use or share their user-activity related data. Accordingly, in some embodiments, functionality provided by IPM handler 260 may be utilized for managing other user-activity related data (i.e., not data that is associated with an IPM session). For example, privacy controller 269 and IPM cleanup component 268 may enable a user (via user interface 220) to identify and control aspects of their user data associated with the applications and services on their user device. Thus, in such embodiments, a user may be provided a more complete picture of their privacy footprint (i.e., how much data from a normal mode of operation is collected and known about them) via a simple user interface. Additionally, through the user interface 220 and features of IPM handler 260, a user may be enabled to control the user-activity related data from normal modes of operation. For instance, a user may modify their location history or delete instant messaging logs. In this way, these embodiments provide a significant improvement to user privacy technology by enabling users to more readily understand and control their user data even when it is not associated with an IPM session.

Privacy controller 269 is generally responsible for facilitating user control of user-activity related data in conjunction with user interface 220 and IPM session settings 282 or user settings/preferences 242. In some embodiments, privacy controller 269 provides computer instructions to user interface 220 for displaying aspects of user privacy settings or for receiving user input to configure aspects of user privacy settings. For example, as described above, some embodiments described herein enable a user to specify which specific applications or services operate within IPM. Similarly, as described above, some embodiments enable a user to control which user-activity related data is provided to applications and services running on their user device. For instance, a user may select specific aspects of user-related activity information (referred to herein as "channels" of user-related activity information), which may include types of user-related activity information (e.g., location, communications, application usage) and may also include data values, conditions, and/or other settings ("parameters") for the types of user-related activity information. The channels and any corresponding channel parameters of user-activity related data may be controlled according to user settings configured via privacy controller 269 and user interface 220. Privacy controller 269 may store the settings received via user interface(s) 220 as IPM session settings 282 or user settings/preferences 242, depending respectively on whether the settings are global or to be preserved, or whether the settings only apply to a specific IPM session.

Figure 5A:
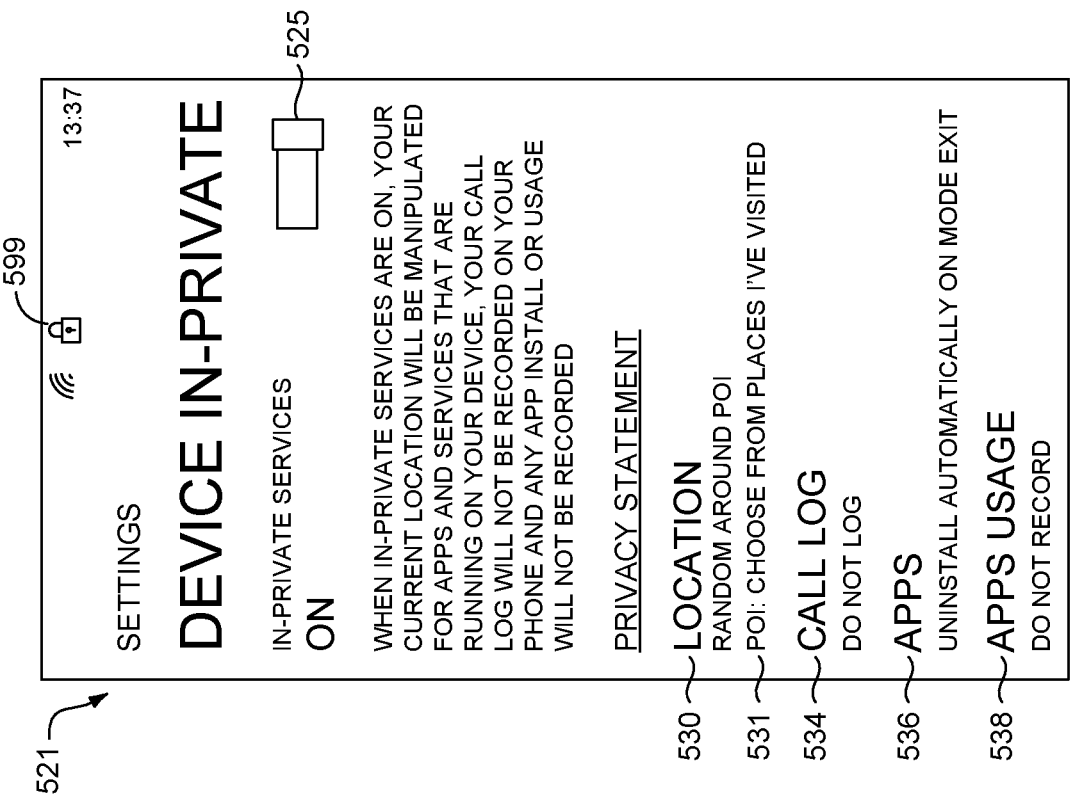
FIGS. 5A, 5B, 5C, and 5D depict screenshots from a personal computing device showing aspects of example graphical user interfaces, in accordance with an embodiment of the present disclosure.

Example embodiments of user interfaces 220 operating as aspects of privacy controller 269 are illustratively provided in FIGS. 5A, 5B, 5C, and 5D. With reference to FIG. 5A, and continuing reference to FIG. 2, an example user interface 220 is provided which shows an example settings menu 501 on a user device, such as a smartphone. The settings menu 501 includes a device in-private setting 510, which the user may selectively invoke to begin an IPM session.

Figure 5B:
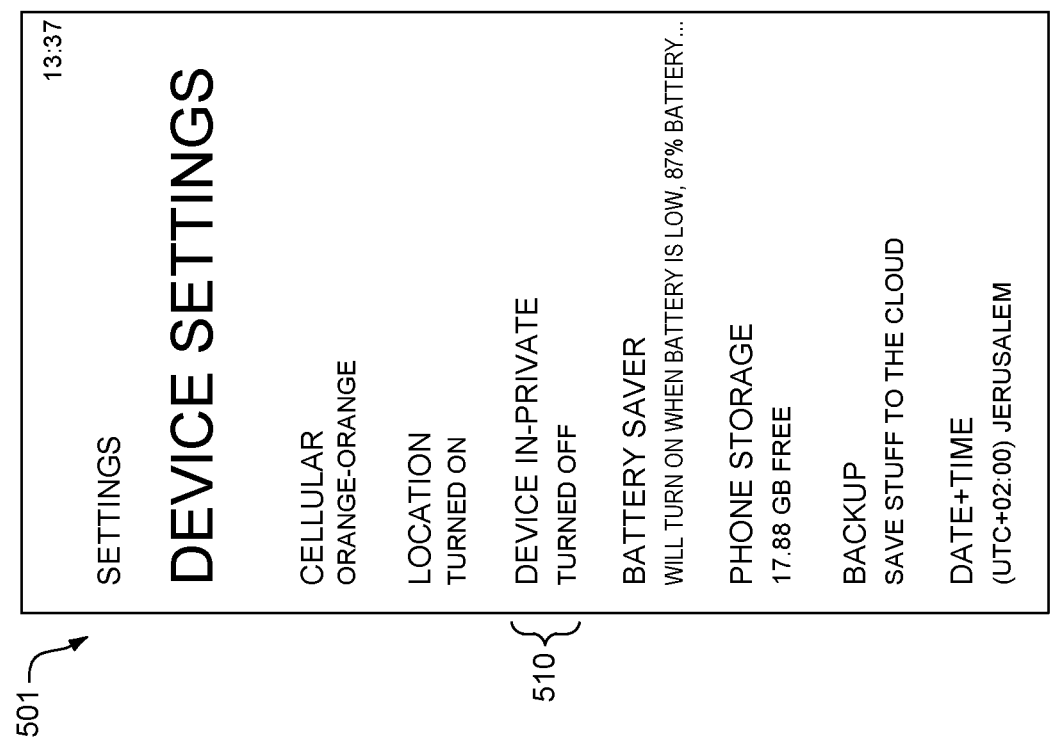

With reference to FIG. 5B, and continuing reference to FIG. 2, an example user interface 220 is provided which shows an example IPM settings control 521, which is an example aspect of an embodiment of privacy controller 269. Here, example IPM settings menu 521 includes a toggle control 525, to facilitate switching between IPM and normal modes of operation, and various example settings for user-activity related data channels (e.g., items 530, 534, 536, and 538) and example channel parameter 531. In particular, the setting for example location channel 530 enables a user to specify how IPM handler 260 should control user-related activity location data. In the example of FIG. 5B, the location channel is configured so that the user's location, within the IPM session, is a random (pseudorandom) location around a point of interest (POI). As explained previously, the location may be controlled to indicate a pseudorandom location that is a valid location for a person (e.g., not located in the middle of a river or the ocean).

FIG. 5B also shows an example channel parameter for the location channel, which sets a value for the point of interest. Here specifically, the POI is set to be a location that the user has previously visited. For instance, a previously visited location (or venue that the user visits often) may be determined via user activity data 248 collected during normal modes of operation. Some embodiments of IPM settings control 521 or privacy controller 269 may display the actual controlled location that will be provided to applications and services in the IPM session. This way, the user knows the specific location that may be reported, logged, or consumed by applications and services during an IPM session.

As shown in FIG. 5B, IPM settings control 521 also includes: an example call log channel setting (item 534), for controlling a call logging data channel (such as whether to log or nor log incoming or outgoing calls); an example apps channel setting (item 536) for specifying whether apps should be uninstalled automatically upon exiting an IPM session to return to a normal mode of operation; and an example apps usage channel setting (item 538) for specifying whether to log application usage during an IPM session. In some embodiments as described herein, various subcomponents of IPM handler 260 operate according to settings specified in IPM session settings 282 or user settings/preferences 242, configured via privacy controller 269 (and via a user interface 220). For example, as described herein, sensor-data controller 262 may modify specific aspects of user-activity related data based on these settings.

Figure 5D:
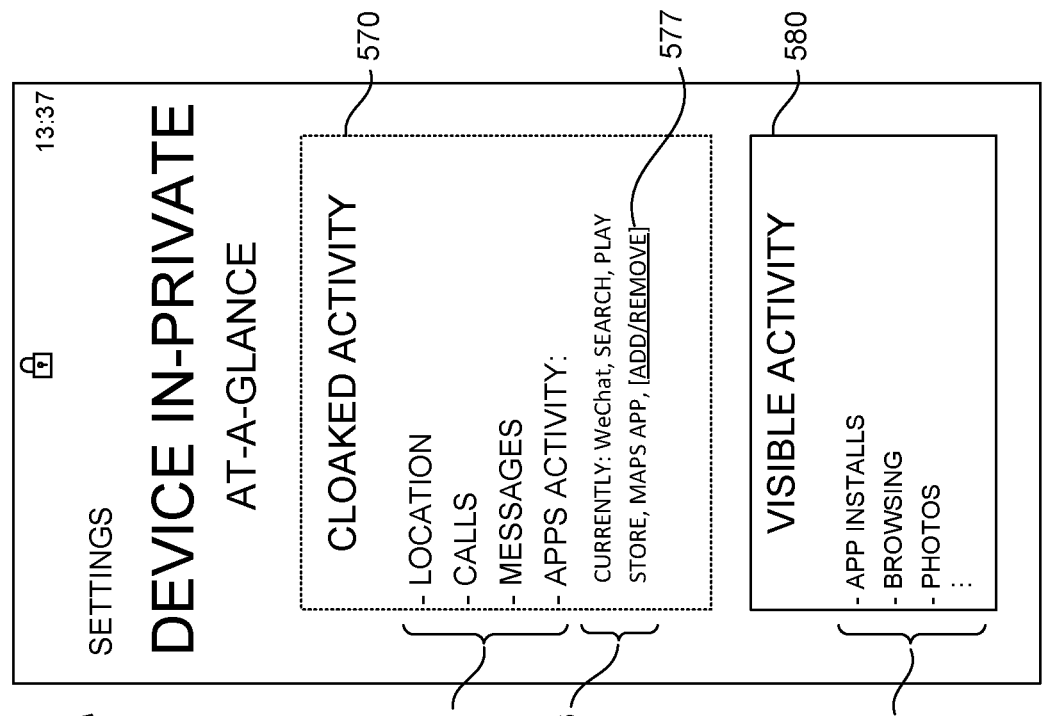
Figure 5C:
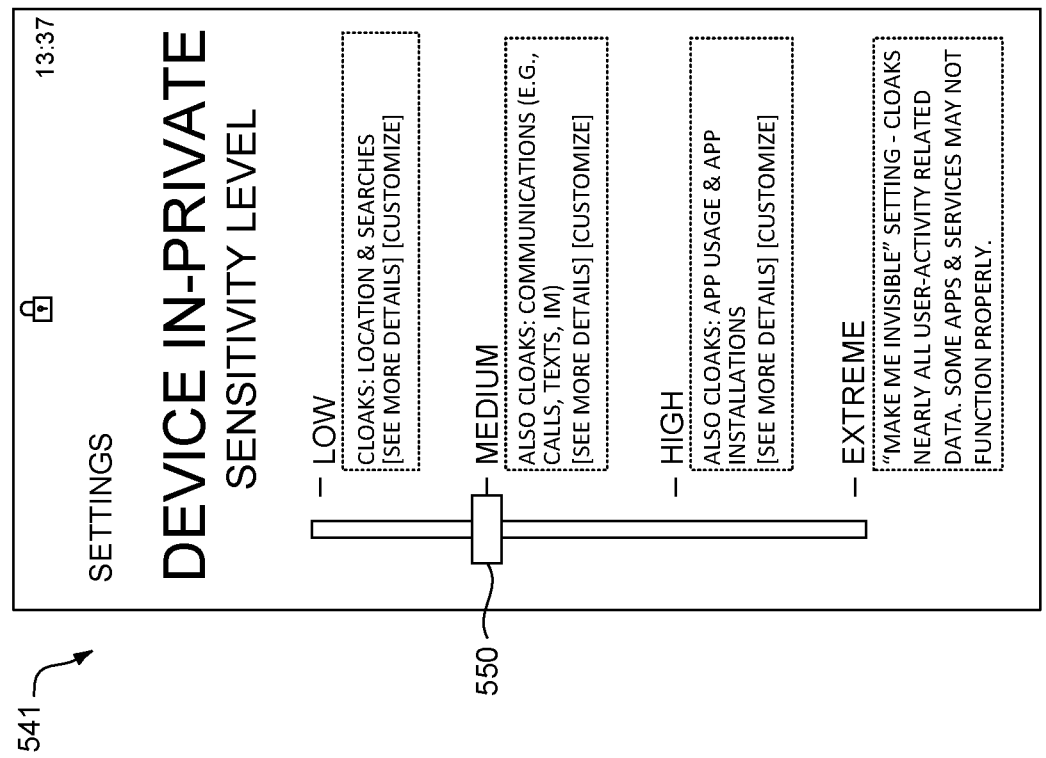

With reference to FIG. 5C, and continuing reference to FIG. 2, another example user interface 220 is provided which shows another example IPM settings control 541, which is an example aspect of an embodiment of privacy controller 269. As described previously, in some embodiments, a user may configure the sensitivity level or degree of privacy protection (i.e., which user-activity related data is obscured, modified, or otherwise kept private and if applicable, to what extent the data is obscured or modified). The levels of sensitivity may be based on default settings or based on previous behavior patterns of the user or other users. In the example shown in FIG. 5C, a GUI element in the form of a slider 550 is used to configure sensitivity level. For instance, by adjusting the position of slider 550, a user may easily tune the privacy sensitivity to different sensitivity levels.

Example IPM settings control 541 shows four example sensitivity levels: low, medium, high, and extreme. By way of example only and without limitation, a "low" sensitivity level may only apply IPM control to the user's location information or may alter the location to another nearby location. A medium sensitivity level may also apply IPM control to the user's communications, such as calls or messages. A high sensitivity level may also include applying IPM control over the user's application installations and usage. (A medium-high setting (not shown) may apply IPM control over some of the user's app usage/installs, which may be specified by the user.) An extreme sensitivity level may apply IPM to nearly all user-activity related data by sink-holing or deleting the data and/or blocking nearly all read/write requests for the user-activity related data, which in some instances may cause certain applications or services to not operate properly. In this extreme configuration, the user may be choosing privacy over the convenience of having fully operational applications and services. In some embodiments, sensitivity may be determined from a set of discrete or specific sensitivity levels (e.g., low, medium, high, extreme) or it may be determined on a continuous scale or nearly continuous sensitivity spectrum of levels, such as from zero sensitivity or low sensitivity to maximum or extreme sensitivity.

In some embodiments, a user may customize the specific applications or services that are customized at the various sensitivity levels, such as my selecting the "customize" option displayed with each sensitivity level. (In some embodiments, a single "customize" option may be presented in the example settings control 541, customization may be configured on a different settings control or user interface, or no customization of specific applications and services is provided.) In the example settings control 541, a "see more details" option is provided to provide additional information about the privacy sensitivity setting. For example, in one embodiment, selecting "see more details" may present a graphical user interface similar to the example of settings control 561 of FIG. 5D.

With reference now to FIG. 5D, and continuing reference to FIG. 2, another example user interface 220 is provided which shows another example IPM settings control 561, which is an example aspect of an embodiment of privacy controller 269. Example IPM settings control 561 provides an "at-a-glance" perspective of IPM user privacy settings. In particular, IPM settings control 561 includes a graphical element 570 showing cloaked activity and graphical element 580 showing visible user activity. Cloaked activity includes user-activity related data (which may include channels), applications, or services that are operating within IPM. For example, as shown in the example configuration of FIG. 5D at 574, location, calls, messages, and certain apps activity are included within a quarantine or IPM session. Further, the specific apps activity (item 576 of FIG. 5D) includes WeChat, Searches, Play Store (or App Store), and a Maps App. A user may add or remove additional apps or services by selecting item 577. Similarly, visible user activity (at item 580) includes user-activity related data (which may include channels), applications, or services that are operating in normal mode and are thus potentially visible to the user or third parties. (Although the term visible is used in this example, it is contemplated that these applications, services, or user-activity related data are not necessarily visible, but rather that these items or information about these items may be accessible to the user or third parties (such as when apps communicate information to back-end servers, as described herein)). For example, as shown in the example configuration of FIG. 5D at 584, app installations, browsing, and photos (such as pictures taken on the user device) are not operating within IPM and are thus potentially visible or accessible to others (or more specifically, information related to app installs, browsing, and photos may be accessible). Additionally, user-activity related data generated from operating these applications and services also may be visible or accessible.

IPM settings control 521, 541, and 561 (FIGS. 5B, 5C, and 5D, respectively) are merely aspects of example embodiments of a privacy controller 269. Other embodiments may provide additional information or include functionality for further configuration, such as controlling which applications or services are included in a quarantine or otherwise operate IPM, which applications or services have access to user-activity related data, or even specifying different channels and parameters for specific applications or services. In this way, for example, one app may receive more specific user data and another app may receive more obscured user data. (Or similarly, a first application may be provided one location for the user device and a second application may be provided with a second, different location for the user device.) Some embodiments of privacy controller 269 may include settings indicating whether certain applications or services should be aware that the user is in an IPM session or not. For instance, some applications and services may have their own built-in privacy functionality (such as limited recording of user information) that may be invoked when the application or service is running during an IPM session. In some instances, where the information about the IPM setting is not exposed to the application or service, it may be assumed that the application or service believes it is operating in normal or regular mode.

Returning to FIG. 2, example system 200 also includes mode manager 270. Mode manager 270 is generally responsible for managing switching between IPM and normal mode. As described herein, in some embodiments, a user may selectively switch between IPM and normal mode so as to utilize applications and services in both environments. For example, a user may engage in two text message conversations: one in the normal mode of operation, which may utilize the user's name (or primary user ID, a phone number, etc.) and another text message conversation in IPM, which may utilize a different name or private user ID. In such instances, mode manager 270 may facilitate aspects of resource management and/or memory separation, such as when two applications are running simultaneously. For instance, mode manager 270 may push memory from the normal mode onto a stack (or persistent storage) when switching to IPM to facilitate restoring the user device to a state prior to the IPM session, upon ending the IPM session (e.g., by pulling that memory off the stack).

As another example of resource management, mode manager 270 may operate in conjunction with session-data controller 262 and/or application activity handler 264 (or their corresponding abstraction layers, in some embodiments) to manage user-activity related data for both modes of operation. For instance, mode manager 270 may direct sensor-data controller 262 to leave unmodified sensor data for a particular application running in normal mode, but modify that data for an application running in IPM (even if it is an instance of the same application). In some embodiments, mode manager 270 manages user device memory or facilitates handling IPM quarantine(s) memory or resources, such as temporarily storing or loading IPM session memory when switching to/from normal mode.

Some embodiments of mode manager 270 may also coordinate displaying notifications to the user regarding whether the user device is operating in private or normal mode, such as the lock symbol 599 shown in FIG. 5B. Additionally, in some embodiments, mode manager 270 may be invoked when toggling control 555 to switch on/off the IPM setting or to leave and return to an IPM session. (For example, some embodiments of privacy controller 269 may include a pause/resume controller or an option to enable users to switch to normal mode.)

Example system 200 also includes user interface 220, which may comprise a graphical user interface (GUI) or other user interface(s). Embodiments of user interface 220 also may function to render various interfaces and various other outputs generated by IPM handler 260 or system 200 and the components thereof in a format that can be displayed on user devices. In some embodiments, user interface 220 includes functionality for managing the presentation of content to a user (or receiving input from a user) across one or more client devices associated with that user. In some embodiments, user interface 220 includes functionality for generating or presenting GUI features. Such features can include interface elements (such as graphics, buttons, sliders, menus, audio prompts, alerts, alarms, vibrations, pop-up windows, notification-bar or status-bar items, in-app notifications, or other similar features for interfacing with a user), queries, and prompts. For example, in one embodiment, user interface 220 includes functionality for presenting one or more user interfaces associated with privacy controller 269, such as the example user interface of IPM settings menu 551, in FIG. 5B. In particular, in some embodiments, user interface 220 may be associated with privacy controller 269 or used for configuring various settings. For instance, a user may set or modify IPM session settings via a user interface 220. In one embodiment, a user interface 220 is provided via applications or services on a user device. In one embodiment, user interface 220 and privacy controller 269 comprise a dashboard or control panel enabling a user to manage aspects of their user-activity related data and/or IPM sessions, and visualize aspects of their privacy exposure, such configured settings for controlling how their user-activity related data is consumed by applications and services.

Example system 200 also includes storage 225. Storage 225 generally stores information including data, computer instructions (e.g., software program instructions, routines, or services), logic (such as user-data control logic 235, described above), user profiles 240, IPM session data, and/or IPM quarantines 280 used in embodiments described herein. In an embodiment, storage 225 comprises a data store or computer data memory. Further, although depicted as a single data store component, storage 225 may be embodied as one or more data stores or may be in the cloud.

As shown in example system 200, storage 225 includes one or more user profiles 240, an example embodiment of which is illustratively provided in FIG. 2. Example user profile 240 includes information associated with a particular user including, among other things, user settings/preferences 242, user account(s)/credentials 244, applications and services 246, and user activity data 248. In one embodiment, a user profile 240 may be associated with a Microsoft account, Google account (or Google Drive), Apple iCloud, or an online cloud-based storage account.

User settings/preferences 242 are described above and generally include, among other user settings, settings and preferences for in-private modes of operation. In particular, in some embodiments, aspects of operating in IPM including operations of IPM handler 260 and its subcomponents may be specified according to user settings/preferences 242 (and/or IPM session settings 282, as described herein). In some embodiments, user settings/preferences 242 may function as "global" or persistent settings that apply to multiple instances of IPMs of operation conducted on the user device. Additionally, in some embodiments, user settings/preferences 242 may be configured by a user via user interface 220 and privacy controller 269, as further described herein.

User account(s)/credentials 244 generally includes data associated with user accounts, such as online accounts (e.g., email, social media), Microsoft® Net passport, user data relating to user accounts such as user emails, texts, instant messages, calls, and other communications; social network accounts and data, such as news feeds; online activity; and calendars, appointments, application data, or the like. For example, user account(s)/credentials 244 may include a user ID (and corresponding credentials) for normal modes of operation, as described herein. In some instances, a user's private user ID (and corresponding credentials) also may be stored here. Some embodiments of user account(s)/credentials 244 store information across one or more databases, knowledge graphs, or data structures.

Applications and services 246 generally comprise one or more computer programs, software services, or routines that operate on or associated with a user device. In some embodiments, applications and services 246 may be stand-alone computer programs that run on the user device and are supported by its operating system. In embodiments described herein, these applications and services may be considered to run or be associated with a normal mode of operation by the user device. For example and without limitation, an application may comprise an app installed by the user, such as an instant messaging application, a video player, or a web browser. Some applications and services 246 also may be integrated into the operating system, such as services or routines that are built into the operating system like certain communications services, user interface services, or read/write services. In some embodiments, information from applications and services 246 may be used by IPM handler 260 or subcomponents, such as quarantine generator 266, to identify particular applications and services to be copied into an IPM session or IPM quarantine 280.

User activity data 248 generally includes user data (including user-activity related data) collected from user-data collection component 210 (which in some cases may include crowdsourced data that is relevant to the particular user), and may further include user history or logs such as location history and usage data. In some embodiments, aspects of information in user activity data 248 may be utilized by privacy controller 269 to provide a holistic perspective of the user's privacy exposure (i.e., what user-related activity information about the user is collected by the user device) and/or to manage the collection of that information. Information in user activity data 248 also may be utilized by some of the embodiments described herein to modify aspects of user-activity related data associated with IPM sessions. By way of example, as described above, in some embodiments, a user's location information during an IPM session may be altered (or replaced) with other location information that is determined based on patterns of the user's activity, such as a location that the user is likely to visit during the time of the IPM session or a location that the user has previously visited.

Continuing with example system 200, storage 225 also includes one or more IPM quarantines 280, an example embodiment of which is illustratively provided in FIG. 2. Example IPM quarantine 280 includes data, logic, and/or computer instructions associated with a particular IPM session, and may include, among other things, IPM session settings 282, user account(s)/credentials 284, applications and services 286, user activity data 288, and a device profile 289. As described previously, in some embodiments, an IPM quarantine 280 may be generated and utilized by IPM handler 260 or its subcomponents; for instance, an IPM quarantine 280 may be created by quarantine generator 266 for supporting an IPM session and may be deleted by IPM cleanup component 268 upon terminating the IPM session.

IPM session settings 282 are described above and generally include settings for a particular IPM session. More specifically, in some embodiments, aspects of an IPM session including operations carried by IPM handler 260 and its subcomponents may be specified according to IPM session settings 282. For example, in an embodiment, quarantine generator 266 may initially generate a quarantine based in part on user settings/preferences 242. Once the quarantine is created, then the user may be provided an option (or may be prompted) to further configure the quarantine (or IPM session) by configuring IPM session settings 282. For example, the user may be prompted to provide a location channel setting specifying how the user-related activity location data should be controlled during the IPM session. Further, in some embodiments, some local settings may be reconfigured within the IPM session. In some embodiments, IPM session settings 282 may be deleted (or cleared) upon terminating the IPM session. Additionally, in some embodiments, IPM session settings 282 may be configured by a user via user interface 220 and privacy controller 269, as further described herein.

User account(s)/credentials 284 generally includes data associated with user accounts utilized within an IPM session, such as online accounts (e.g., email, social media), Microsoft® Net passport, user data relating to user accounts such as user emails, texts, instant messages, calls, and other communications; social network accounts and data, such as news feeds; online activity; and calendars, appointments, application data, or the like. User account(s)/credentials 284 may include the same (or some of the same) or different information as the user account(s)/credentials 244 for normal modes of operation. For example, user account(s)/credentials 244 may include a private user ID (and corresponding credentials) for IPM operation, as described herein, which may be the same ID (with the same corresponding credentials) as the user ID utilized for normal modes of operation, or may be a different user ID.

Applications and services 286 generally comprise one or more computer programs, software services, or routines that operate on a user device during an IPM session or are otherwise associated with the particular IPM session supported by IPM quarantine 280. In some embodiments, applications and services 286 may be determined from applications and services 246 (from the normal mode of operation) and/or may be specified in user settings/preferences 242 or IPM session settings 282. Additionally, as described herein, in some instances, applications and services 286 may be uninstalled or deregistered (such as by IPM cleanup component 268) upon ending an IPM session or after a period of time in an IPM session.

User activity data 288 generally includes user data (including user-activity related data) collected from user-data collection component 210 that is collected during or associated with an IPM session. User activity data 288 may be controlled during an IPM session by IPM handler 260 or one or more of its subcomponents. For example, in some embodiments, user activity data 288 may be received from sensor-data controller 262; for instance, as described herein, sensor-data controller 262 may receive and control (including modifying) user data from user-data collection component 210, and make it available to applications and services 286 associated with the IPM session. In some embodiments, certain user activity data 288 (which may be specified in user settings/preferences 242 or IPM session settings 282) may not be collected, monitored, or stored during the IPM session, may be preserved within IPM quarantine 280 where needed by an application or service 286, and/or may be deleted upon terminating an IPM session. In some embodiments, aspects of information in user activity data 288 may be utilized by privacy controller 269 to manage or control user-activity related data within an IPM session.

Device profile 289 generally includes information about the user device profile, system, or hardware profile modeled in an IPM quarantine for supporting an IPM session or otherwise associated with IPM quarantine 280. For example, as described above, some embodiments of quarantine 280 may have user device profile (or hardware profile or OS) that is different than the underlying user device hardware and/or OS (i.e., the hardware and OS of the mobile device itself). This is similar to some virtual machine technology that may be configured to operate as a different type of computer system or OS than the device or OS that is supporting the virtual machine. Among other privacy advantages realized by using a different device profile for an IPM session than the underlying user device hardware is that some applications and services 286 may track or identify a user based on information derived from hardware or user device features such as a hardware ID or a hash created by information characterizing aspects of the user hardware, OS, and/or applications and services 286. Thus, by controlling this information, user privacy is preserved. In some embodiments, aspects of device profile 289 may be specified in user settings/preferences 242 or IPM session settings 282.

Figure 4:
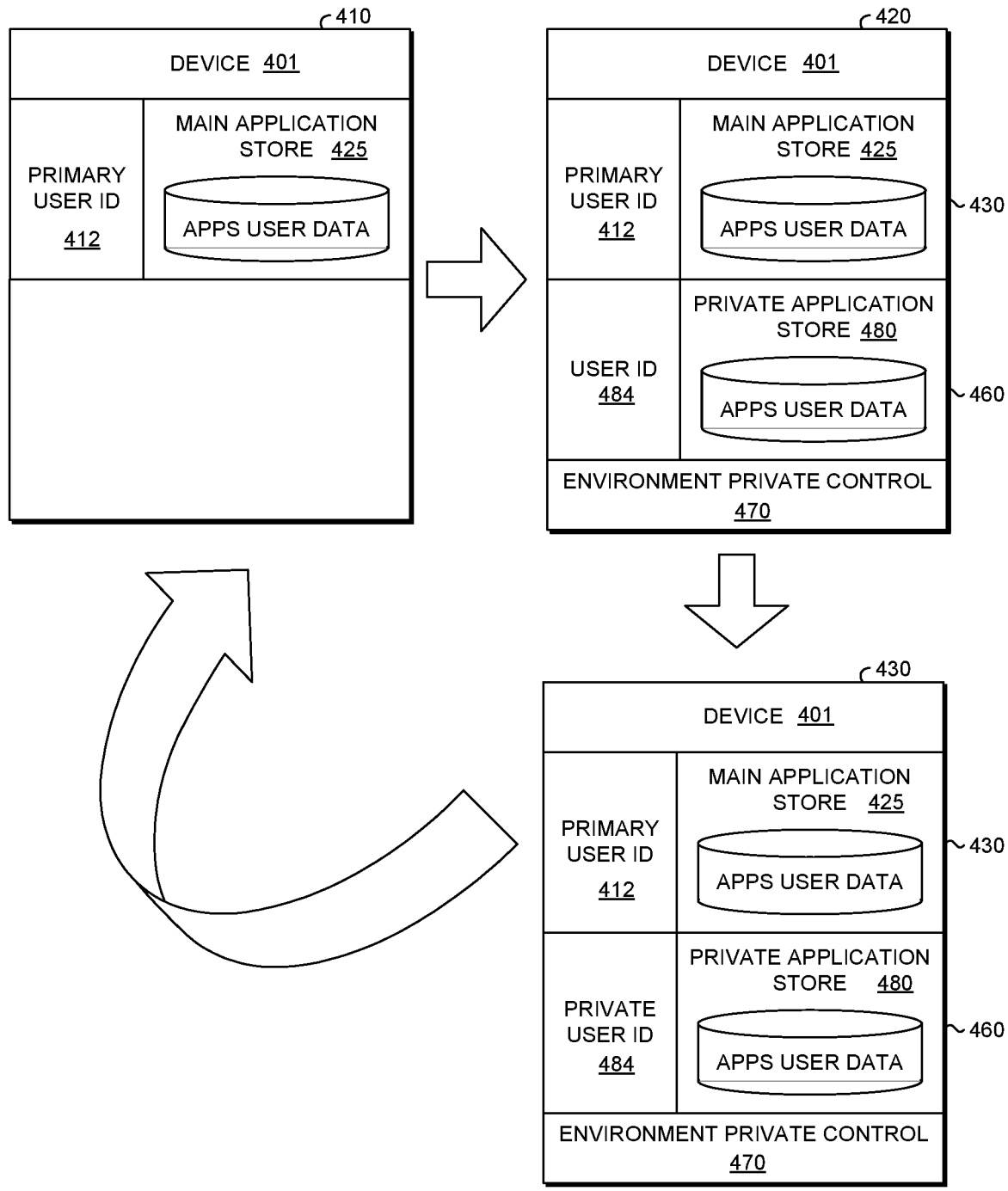
FIG. 4 is a diagram showing aspects of an example in-private mode session conducted on a personal computing device, in accordance with an embodiment of the present disclosure.

Turning now to FIG. 4, a diagram is provided illustrating aspects of an example IPM session conducted on a user device. FIG. 4 shows three representations or states, 410, 420, and 430, of the user device during an example IPM session. The IPM session begins at state 410, where user device 401 is shown in the normal mode of operation. In particular, user device 401 is shown having a main application store 425 comprising installed apps and user data, which may include user-activity related data. Main application store 425 may be embodied as applications and services 246 and user activity data 248 of system 200 in FIG. 2. User device 401 also has a primary user ID 412, which is associated with the user during the normal mode of operation, and which may be stored in user accounts/credentials 244 of system 200 in FIG. 2.

At state 420, an IPM session has started and user device 401 now includes aspects of a computer system (such as various system resources) associated with the normal mode of operation (designated as item 430) and aspects of the computer system (such as various system resources) associated with or supporting an IPM session (designated as item 460). In some embodiments, the IPM session may have been initiated by a user selecting an in-private mode setting, such as the toggle switch 555 user interface element of FIG. 5B. In some embodiments, item 460 may correspond to a quarantine operating on the user device, such as example IPM quarantine 280 described in FIG. 2, which may function like a virtual machine. Thus, in some embodiments, upon starting an IPM session, a quarantine for supporting the IPM is created.

In particular, user device 401 now includes a private application store 480 (a second application store), a second user ID 484 which will be used by the IPM session designated by item 460, and environment private control 470. In some embodiments, private application store 480 may be embodied as described in connection to applications and services 286 and user activity data 288 of IPM quarantine 280 in system 200 (FIG. 2). Moreover, in some embodiments, existing applications and services of the user (such as applications and services already installed on the user device) are automatically installed on the fly into the quarantine, with or without an additional fee to the applications' providers per the commercial terms of those applications and services.

In the example embodiment depicted in FIG. 4, environment private control 470 may be utilized to manage the mode of operation on the user device (including switching between normal and IPM) as well as manage specific aspects of the IPM, such as various settings for controlling user-activity related data. Thus, the functions provided by environment private control 470 are similar to functions provided by mode manager 270 and IPM handler 260 (or subcomponents such as privacy controller 269) of system 200. Accordingly, in some embodiments, a user may set the values of the user-activity related data (or other data collected by user-data collection component 210) as well as the methods by which the data is controlled to be provided to the applications and services running in the IPM session (i.e., the applications and services in private application store 480). Further, in some embodiments, the applications and services data associated with the IPM session (e.g., call logs, scores, locations, settings, etc.) are stored within the quarantine in a data structure that is compatible with the normal mode environment 430 or main applications store 425.

At state 430, user device 401 is supporting two modes of operation: normal mode (designated at item 430) and IPM (designated at item 460). The second user ID 484 of state 420 is shown as the private user ID 484. As described herein, this user ID may be the same as the normal or primary user ID 412, in some embodiments. In some embodiments, a user may choose regarding which user ID to login for the quarantine environment. In this way, the user can choose another ID that is not the primary and thus is not used in the main applications environment. This private ID (and corresponding credentials) may be used for the applications and services associated with the private mode environment, similar to the way the primary user ID and credentials are used in the normal mode.

In some embodiments, a user may utilize near-simultaneous applications and services in both environments. For instance, a user may communicate via text messaging using two user IDs—the primary ID and private ID, corresponding to the normal and controlled (IPM) environments. Upon ending the IPM session, the computing system resources used for supporting the IPM (designated as item 460, which may be embodied as an IPM quarantine 280) are cleared from the user device (i.e., the quarantine virtual device is fully erased or the memory supporting the IPM is deleted, resources are freed, services deregistered, apps uninstalled, etc., as described herein). The state of the user device is then restored to a state 410, which is the device state prior to conducting an IPM session.

Figure 6:
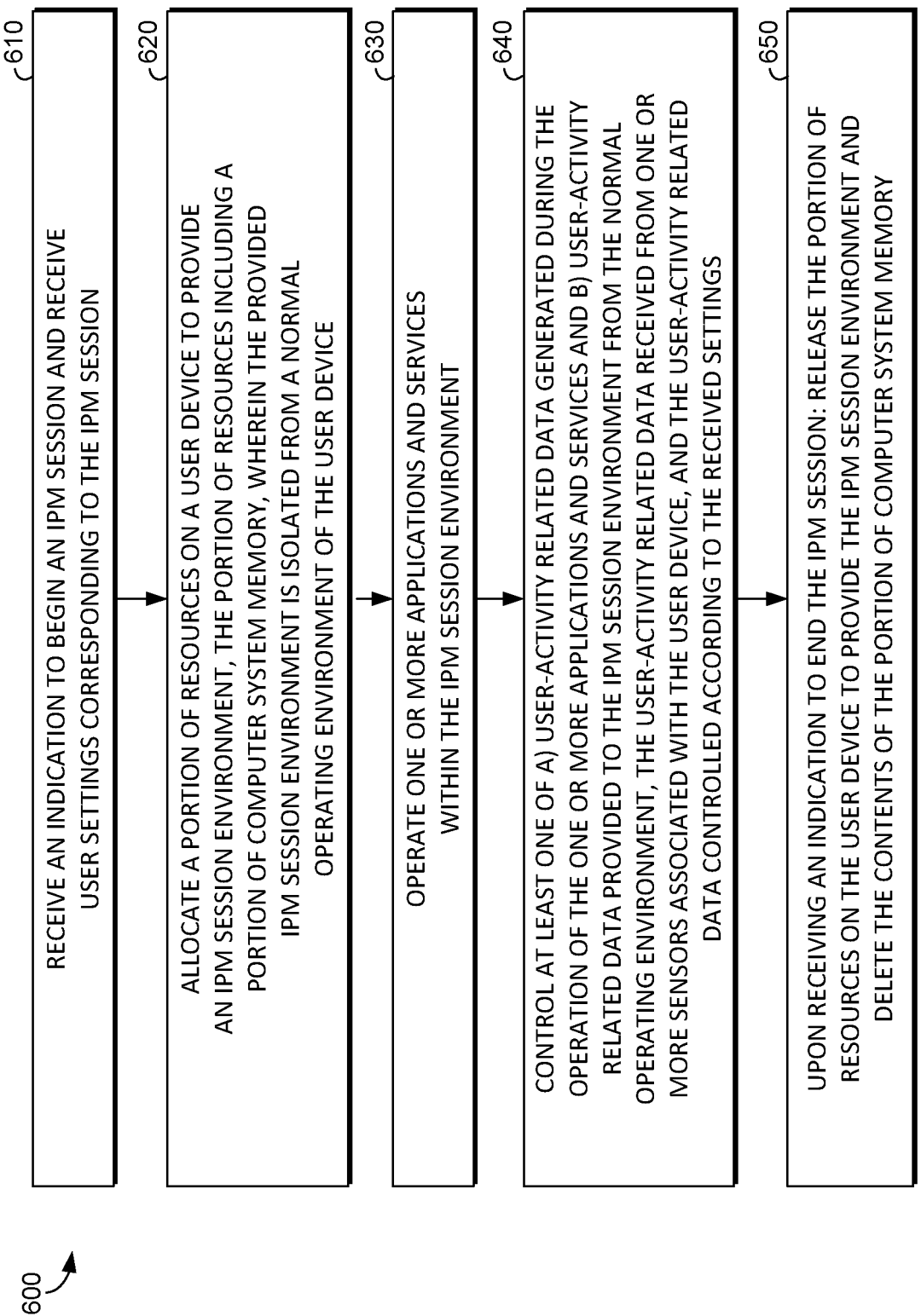
FIG. 6 is a flow diagram of a method for providing an in-private mode session on a user device, in accordance with an embodiment of the present disclosure.

Turning now to FIG. 6, a flow diagram is provided illustrating one example method 600 for providing an in-private mode (IPM) session of operation on a user device. In one embodiment, method 600 may be performed in part by IPM handler 260 of system 200. In one embodiment, method 600 may be carried out as a cloud-based process or a distributed computing process, using one or more servers or other computing devices. Each block or step of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 610, the method includes receiving an indication to begin an IPM session and user settings corresponding to the IPM session. Embodiments of step 610 may comprise receiving from the user an indication to enter an in-private mode of operation or otherwise begin an IPM session. For example, in one embodiment, a user may select a setting (such as toggle switch 555 in FIG. 5B) to turn on IPM and begin an IPM session. User settings may comprise configuration settings specified in user settings/preferences 242, which may apply to all IPM sessions, and/or IPM session settings 282, which apply to this particular IPM session, as described in connection to FIG. 2. In some embodiments, the settings may specify aspects of controlling user-activity related data generated or utilized during the IPM session; for example, modifying certain channels or parameters such as location information.

At step 620, the method includes allocating a portion of resources on the user device to provide an IPM session environment. The allocated portion of resources includes a portion of computer system memory, and the IPM session environment is provided to be isolated form the normal operating environment of the user device. Embodiments of step 620 initialize an IPM session environment by creating an IPM session environment having computer system resources for supporting the IPM session. The IPM session environment is created to be isolated from the normal operating environment on the user device; for example, as described previously, the IPM session environment may be isolated by running as (or within) a virtual machine that operates on the normal operating environment. In some embodiments, the IPM session environment is quarantined from the normal operating environment and may be embodied as quarantine 280 described in FIG. 2. Some implementations of step 620 may be carried out using quarantine generator 266 (or IPM handler 260), such as described in system 200 of FIG. 2. Additional details of embodiments of step 620 are provided in connection with IPM handler 260 in FIG. 2.

At step 630, the method includes operating one or more applications and services within the IPM session environment. These applications and services are operating within or associated with the IPM session. (For example, applications and services 286 described in IPM quarantine 280 of FIG. 2.) In step 630, the IPM session may be utilized by a user using one or more applications and services associated with the IPM session or installed and operating within the IPM session. As described previously, when creating an IPM session environment or quarantine, some embodiments copy the apps already installed on the user device (in the normal mode) into the IPM quarantine. In some embodiments, the applications or services provided for use in the IPM session or quarantine 280 may be specified by user settings, such as user settings/preferences 242 or IPM session settings 282.

At step 640, the method includes controlling at least one of (a) an aspect of user-activity related data generated during the operation of the one or more applications and services (step 630) and (b) an aspect of the user-activity related data provided to the IPM session environment from the normal operating environment. The user-activity related data may be received from one or more sensors associated with the user device, such as sensors described in connection with user-data collection component 210 in FIG. 2, and the user-activity related data is controlled according to the settings received in step 610. In particular, embodiments of step 640 control aspects of the user-activity related data that may be generated by the applications and services operating within the IPM session or provided to the IPM session environment. For example, with regards to (b), where an app running within the IPM session requests user location data (which is an example of user-activity related data), an embodiment of step 640 may control the location data that is provided to the app, such as, for instance, by modifying the location data based on user settings, as described previously. Additional details of this functionality of step 640 are described in connection to sensor-data controller 262 of FIG. 2, and some embodiments of this functionality carried out in step 640 may be provided by session-data controller 262 (or IPM handler 260). Similarly, embodiments of step 640 may control (a) user-activity related data that is generated by one or more applications or services running within the IPM session environment. For instance, certain logging of user-activity data generated by a messaging app might be modified, deleted, sink-holed, or read/write requests may be blocked (or similar means for blocking the recording and storage of the user activity). Additional details of this functionality of step 640 are described in connection to application activity handler 264 of FIG. 2, and some embodiments of this functionality carried out in step 640 may be provided by application activity handler 264 (or by IPM handler 260). Thus, some embodiments of step 640 contemplate two functions of controlling user-activity related data: that data which may be generated by applications and services running within (or associated with) the IPM session and that data which may be utilized by these applications and services, but which may be provided by other components of the user device (including hardware components, such as some sensors).

At step 650, upon receiving an indication to end the IPM session, the method includes releasing the portion of resources on the user device used to provide or support the IPM session environment, and deleting the contents of the portion of computer system memory. Embodiments of step 650 generally facilitate removing IPM session data from the user device (or other memory). For example, memory allocated to support the IPM session (such as a quarantine 280) may be deleted and other system resources that may have been reserved for supporting the IPM session may be freed or de-allocated. In some embodiments, prior to deleting the IPM session data, any applications installed during the IPM session may be uninstalled and/or services registered may be deregistered. Additionally, in some embodiments, a set of replacement data may be generated to replace user data deleted when the IPM session data is deleted, as described herein. Some embodiments of step 650 may be carried out by IPM cleanup component 268 of FIG. 2. Additional details of step 650 are described in connection to IPM handler 260 of FIG. 2.

Figure 7:
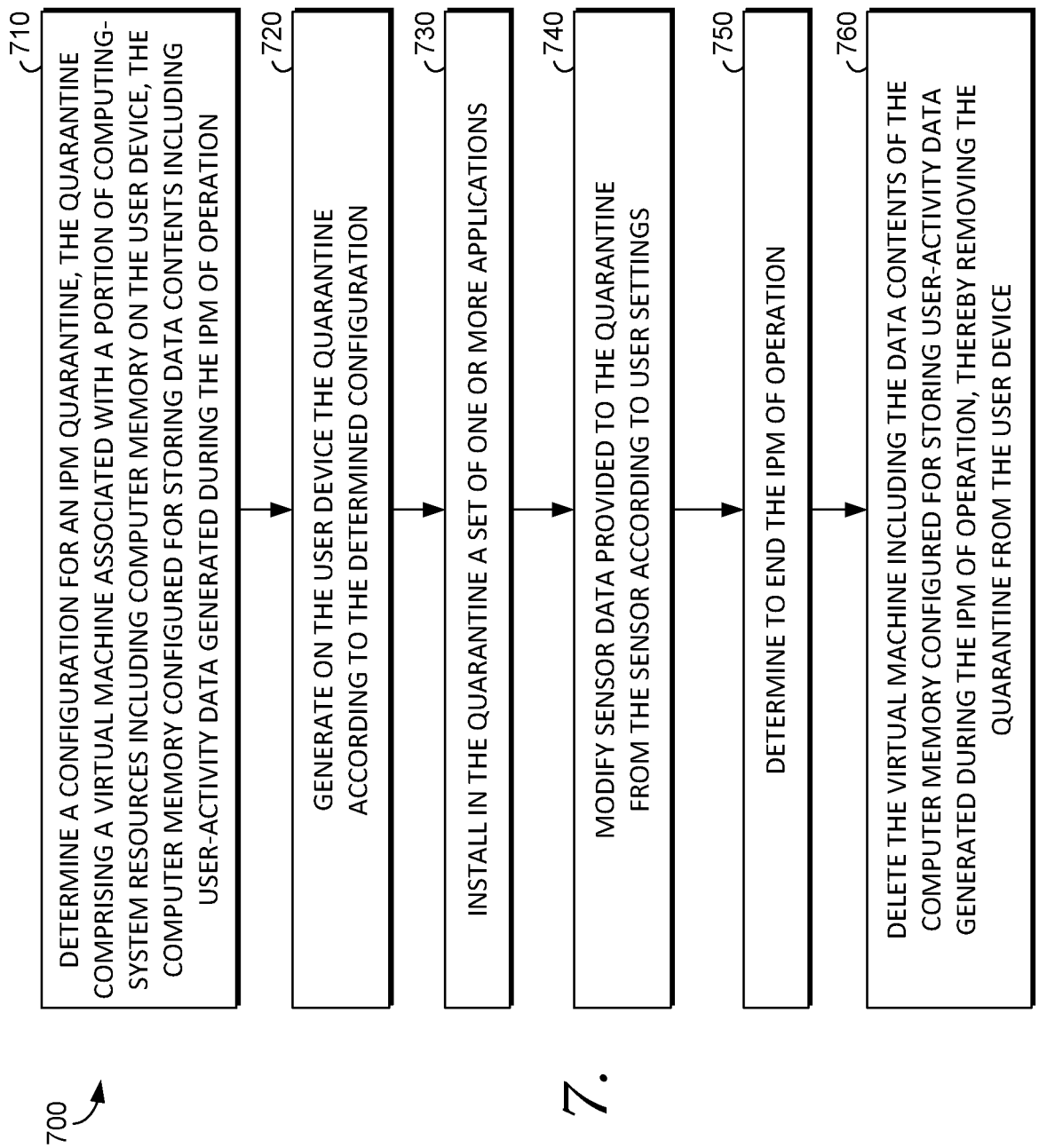
FIG. 7 is a flow diagram of a method for controlling user privacy by providing an in-private mode on a user device, in accordance with an embodiment of the present disclosure.

With reference now to FIG. 7, a flow diagram is provided illustrating one example method 700 for controlling user privacy by providing an in-private mode on a user device. In some embodiments, method 700 may be performed in part by IPM handler 260 of system 200. Method 700 also may be carried out as a cloud-based process or a distributed computing process, using one or more servers or other computing devices.

Accordingly, at step 710, the method includes determining a configuration for an IPM quarantine, the quarantine comprising a virtual machine associated with a portion of computing-system resources including computer memory on the user device, the computer memory configured for storing data contents including user-activity data generated during the IPM of operation. Embodiments of step 710 determine a configuration for a quarantine for supporting an IPM of operation on a user device, such as quarantine 280 described in connection to FIG. 2. As described herein, the configuration of the quarantine may be determined from settings, such as user settings/preferences 242 or IPM session settings 282. For example, settings may determine which applications will be installed in the quarantine or how various channels of user-activity related data will be handled in the quarantine or during the IPM of operation. In some embodiments, the quarantine may be first configured according to global settings, which may be specified in user settings/preferences 242, and then configured according to settings associated with a particular IPM session, such as IPM session settings 282. Further, in some embodiments, the user settings are user-adjustable via a privacy controller user interface, such as described in connection with privacy controller 269 of FIG. 2.

At step 720, the method includes generating, on the user device, the quarantine according to the configuration determined in step 710. Embodiments of step 720 create a quarantine for supporting an IPM session on the user device, such as a quarantine 280, described in FIG. 2. For example, in some embodiments, a portion of computing system resources on the user device, including computer system memory, may be allocated to support a virtual machine for the quarantine. The quarantine may be generated based on the user settings used to determine its configuration in step 710.

At step 730, a set of one or more applications is installed in the quarantine. Embodiments of step 730 install one or more computing applications, such as apps or computer programs in the IPM computing environment of the quarantine. Some embodiments of step 730 may also install (or register) one or more computer services. As described herein, some embodiments copy one or more apps already installed on the user device (in the normal mode) into the IPM quarantine upon its creation (or shortly thereafter). In some embodiments, the applications to be installed in an IPM quarantine (such as IPM quarantine 280) or an IPM session environment are specified by user settings, such as user settings/preferences 242 or IPM session settings 282. Some embodiments of steps 710, 720, and/or 730 may be carried out by quarantine generator 266 of FIG. 2. Additional details regarding embodiments of the functions performed by steps 710, 720, and 730 of method 700 are described in connection to IPM handler 260 of FIG. 2.

At step 740, the method includes modifying sensor data provided to the quarantine from the sensor according to user settings. Embodiments of step 740 control the sensor data, which may comprise user-activity related data, that is provided to the IPM quarantine from sensors associated with the user device. For example, as described herein, user-related activity information provided by a user-data collection component 210 (which may include data derived from a sensor) may be controlled, for example by modification, via a sensor-data controller component 262 (FIG. 2), IPM sensor data handler abstraction layer 320 (FIG. 3), or IPM handler 260 (FIG. 2). In some embodiments, the control or modification of the user-related activity information (or sensor data) is determined based on user settings, such as user settings/preferences 242 or IPM session settings 282.

In some embodiments of step 740, the sensor data comprises location information indicating a first geographical location, and modifying the sensor data comprises altering the indicated location to a different geographical location. In some embodiments, the location may be altered to indicate that the user device is in a geographical area, or to indicate that the user device is at a pseudorandom, valid location within a geographical area, which may be specified in user settings. Further, in some embodiments, during an IPM session, the modified location may be changed so as to appear that the user device is moving locations during the IPM session and is not at the same location. In this way, the modified location appears more realistic. In some embodiments, the modified location (or more generally, the modified sensor data) is modified based on user activity from prior to the IPM session (or prior to operating in IPM). For example, as described herein, user-activity related data, such as location, may be altered to indicate a location the user has previously visited (or may even be modified based on a determined pattern of user activity, such as altering the location to be a place that the user is likely to be located during the time of the IPM session), based on historical user location information. Some embodiments of step 740 may be carried out by sensor-data controller 262 or IPM handler 260 of FIG. 2. Additional details regarding embodiments of the functions performed by step 740 are described in connection to IPM handler 260 of FIG. 2.

At step 750, the method includes determining to end the IPM of operation. Embodiments of step 750 determine to terminate the IPM of operation on the user device (or to end an IPM session conducted via the user device). In some embodiments, the determination to end the IPM of operation is based on an indication received from a user, such as upon the user selecting a setting of the user device to normal mode (or a setting that "turns off" IPM), such as the example toggle switch 555 shown in FIG. 5B. In some embodiments, a determination to end the IPM of operation is based on a time span elapsing, such as a trial or demo period of time for IPM operation or after a period of time when user-related activity is not detected on the user device. (In some embodiments, this feature may be configured in user settings.)

At step 760, the method includes deleting the virtual machine including the data contents of the computer memory configured for storing user-activity data generated during the IPM of operation, thereby removing the quarantine from the user device. Embodiments of step 760 clear the IPM quarantine from the user device (or from other computer memory, if the quarantine or portions of it are stored off of the user device, such as in the cloud).

During IPM operation, applications or services associated with the user device, including the one or more applications installed in step 730, may generate user-activity related data that is stored in the contents of the computer memory. Accordingly, embodiments of step 760 include deleting the data contents of this user-activity related data when deleting the quarantine. In some embodiments, this data may be stored in the computer memory of the quarantine, and thus deleting the quarantine results in deleting this data. But it is also contemplated that some user-activity related data generated during IPM operation may be stored in other memory, such as memory not associated with an IPM session or even memory not located on the user device (e.g., memory on a server or in the cloud). Thus, some embodiments of step 760 comprise deleting contents from this memory as well as deleting the quarantine, so that this user-activity related data does not persist in computer storage after the IPM session has ended. Some embodiments of step 760 also include uninstalling the set of one or more installed applications prior to deleting the virtual machine. Some services registered during the IPM may be deregistered prior to deleting the virtual machine. Some embodiments of step 760 may be carried out by IPM cleanup component 268 or IPM handler 260 of FIG. 2. Additional details regarding embodiments of the functions performed in step 760 are described in connection to IPM handler 260 (FIG. 2).

Some embodiments of method 700 further comprise controlling an operation involving user-activity related data and associated with the set of one or more applications (or a services) installed in the quarantine. For example, as described herein, application activity handler 264 (FIG. 2) or IPM app handling abstraction layer 350 (FIG. 3) may control aspects of operations associated with the applications or services of an IPM session, and in particular operations involving user-activity related data. By way of example, in one embodiment where the operation comprises communicating user-activity related data with a back-end server, the operations may be controlled by blocking the communication. Similarly, in another embodiment, where the operation comprises storing user-activity related data at a location in memory (either on the user device or in the cloud), the operation may be controlled (such as by modifying the read/write command) by blocking the storing of the data or changing the location in computer system memory for storing the data. For instance, the location may be changed from memory outside the quarantine to a memory location inside (or associated with) the quarantine, so that the contents of that memory may be more readily deleted upon ending the IPM session. In some embodiments, operations may be controlled based on user settings, such as user settings/preferences 242 or IPM session settings 282. Additional details of functions that may be performed by these example embodiments is described in connection to application activity handler 264 or IPM handler 260 of FIG. 2.

Some embodiments of methods 600 or 700 further comprise switching into normal mode of operation while in an IPM session or utilizing applications or services in both mode environments, as described herein. For instance, in some embodiments, a user might be engaged in two text message conversations: one in the regular or normal mode of operation (i.e., not IPM) and another text conversation in IPM. Suppose for example that a particular user is spending a weekend visiting Las Vegas. As the saying goes, "what happens in Vegas, stays in Vegas;" thus, the user wishing to realize this objective may begin an IPM session on their mobile device for at least a portion of the visit. But at some times, the user may still desire to access communications (or other phone apps or functions) in normal mode, such as emails or texts about flights or calling their family. Accordingly, the user may switch into a normal mode of operation to use at those times, and the IPM session may be maintained (ongoing) or temporarily suspended. Further, in some embodiments, a visual indicator may be presented via a user interface letting the user know that the present use of a particular application or service either is or is not in the private mode. (For example, a lock symbol 599, as shown in FIG. 5B, may be presented, or as another example of a visual indicator, the window border of an application operating IPM may be a different color.) Some of these embodiments may be facilitated by an operation mode manager, such as mode manager 270 of FIG. 2. Additional details of functions of these example embodiments are described in connection with mode manager 270 of FIG. 2.

Accordingly, we have described various aspects of technology directed to systems and methods for improving user privacy and providing user control over the user-activity related data collected from personal computing devices. It is understood that various features, sub-combinations, and modifications of the embodiments described herein are of utility and may be employed in other embodiments without reference to other features or sub-combinations. Moreover, the order and sequences of steps shown in the example methods 600 and 700, or the example IPM session of FIG. 4, are not meant to limit the scope of the present disclosure in any way, and in fact, the steps may occur in a variety of different sequences within embodiments hereof. Such variations and combinations thereof are also contemplated to be within the scope of embodiments of this disclosure.

Having described various implementations, an exemplary computing environment suitable for implementing embodiments of the disclosure is now described. With reference to FIG. 8, an exemplary computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal digital assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 824 (or similar wireless communication components). The radio 824 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computing device comprising:
   one or more sensors configured to provide sensor data including user-activity related information;
   one or more processors; and
   computer storage memory having computer-executable instructions stored thereon which, when executed by the one or more processors, implement a method for providing an in-private mode (IPM) session on the computing device, the method comprising:
   receiving an indication to begin an IPM session and user settings information corresponding to the IPM session;
   allocating a portion of computer system resources on the computing device to provide an IPM session environment, the portion of computer system resources including a portion of computer system memory, and wherein the IPM session environment is isolated from a normal operating environment of the computing device;
   operating one or more applications and services within the IPM session environment;
   controlling at least one of a) a first set of user-activity related information generated during the operation of the one or more applications and services or b) a second set of user-activity related information provided to the IPM session environment from the normal operating environment, the second set of user-activity related information received from the one or more sensors, wherein the first and second sets of user-activity related information are controlled according to the received user settings information;
   upon receiving an indication to end the IPM session:
      deleting at least a subset of the first set of user-activity related information,
      replacing the deleted at least a subset of the first set of user-activity related information with a set of replacement data, and
      prior to ending the IPM session, determining from the one or more applications and services at least one application installed within the IPM session environment, and uninstalling the at least one application.

2. The computing device of claim 1, wherein the method further comprises:
   upon receiving the indication to end the IPM session:
   releasing the portion of computer system resources on the computing device, and
   deleting contents of the portion of computer system memory.

3. The computing device of claim 2, wherein releasing the portion of computer system resources comprises making at least one resource of the portion available for use by a process on or a component of the computing device that is not associated with the IPM session.

4. The computing device of claim 2, wherein the contents of the portion of computer system memory include the at least a subset of the first set of user-activity related information generated during the operation of the one or more applications and services, and wherein the method further comprises generating the set of replacement data; and storing the set of replacement data on the computing device.

5. The computing device of claim 4, wherein the set of replacement data is generated based on user-activity information derived from user activity occurring at a time prior to the IPM session.

6. The computing device of claim 1, wherein controlling the first or second set of user-activity related information comprises modifying the first or second set of user-activity related information.

7. The computing device of claim 6, wherein the second set of user-activity related information comprises location data, and wherein the location data is modified by altering a value of the location data received from the one or more sensors such that the modified location value indicates a different geographical location than a geographical location indicated by the location data received from the one or more sensors.

8. The computing device of claim 1, wherein the IPM session environment comprises an IPM quarantine, and wherein the quarantine is a virtual machine.

9. The computing device of claim 1 further comprising a user interface component comprising one or more controllers configured to specify the user settings information corresponding to the IPM session.

10. A method for controlling user privacy by providing an in-private mode (IPM) of operation on a user device having a sensor, the method comprising:
   determining a configuration for an IPM quarantine, the quarantine comprising a virtual machine associated with a portion of computing-system resources including computer memory on the user device, the computer memory configured for storing data contents including user-activity data generated during the IPM of operation, wherein locations of data contents stored in the computer memory are not accessible to a normal operating environment of the user device;
   generating on the user device the quarantine according to the determined configuration;
   installing in the quarantine a set of one or more applications;
   modifying, according to a set of user settings, sensor data provided to the quarantine from the sensor;
   determining to end the IPM of operation on the user device;
   upon determining to end the IPM of operation:
      uninstalling the set of one or more installed applications prior to deleting the virtual machine, and
      deleting the virtual machine including the data contents of the computer memory configured for storing the user-activity data generated during the IPM of operation, thereby removing the quarantine from the user device, wherein at least a subset of the user-activity data is replaced with a set of replacement data.

11. The method of claim 10, wherein the configuration specifies how user-activity related data is controlled during the IPM of operation, and wherein the configuration is determined according to the set of user settings.

12. The method of claim 10, wherein the sensor data comprises location information indicating a first geographical location and wherein modifying the sensor data comprises changing the location information indicating the first geographical location to location information indicating at least a second geographical location.

13. The method of claim 12, wherein the at least a second geographical location comprises a plurality of geographical locations that are varied over a time span during the IPM of operation, so as to appear that the user device is moving over the time span, the plurality of geographical locations within a geographical area specified in the set of user settings.

14. The method of claim 10 further comprising controlling an operation involving the user-activity data, the operation associated with an application in the set of one or more applications installed in the quarantine.

15. The method of claim 14, wherein controlling the operation comprises modifying the operation.

16. The method of claim 15, wherein the operation comprises communicating user-activity related data with a server and wherein modifying the operation comprises blocking the communication.

17. The method of claim 15, wherein the operation comprises storing user-activity related data at a one or more sensors memory location, and wherein modifying the operation comprises one of blocking the storing of the user-activity related data or changing the memory location for storing the user-activity related data.

18. At least one computer storage medium having computer-executable instructions stored thereon which, when executed by at least one processor, implement a method for providing an in-private mode (IPM) session on a computing device, the method comprising:
  receiving an indication to begin an IPM session and user settings information corresponding to the IPM session;
  allocating a portion of computer system resources on the computing device to provide an IPM session environment, the portion of computer system resources including a portion of computer system memory, and wherein the IPM session environment is isolated from a normal operating environment of the computing device;
  operating one or more applications and services within the IPM session environment;
  controlling at least one of a) a first set of user-activity related information generated during the operation of the one or more applications and services or b) a second set of user-activity related information provided to the IPM session environment from the normal operating environment, the second set of user-activity related information received from at least one sensor, wherein the first and second sets of user-activity related information are controlled according to the received user settings information;
  upon receiving an indication to end the IPM session:
    deleting at least a subset of the first set of user-activity related information,
    replacing the deleted at least a subset of the first set of user-activity related information with a set of replacement data, and
    prior to ending the IPM session, determining at least one application, of the one or more applications and services, installed within the IPM session environment, and uninstalling the at least one application.

19. The at least one computer storage medium of claim 18, wherein the method further comprises:
  upon receiving the indication to end the IPM session:
  releasing the portion of computer system resources on the computing device, and
  deleting contents of the portion of computer system memory.

20. The at least one computer storage medium of claim 19, wherein releasing the portion of computer system resources comprises making at least one resource of the portion available for use by a process on or a component of the computing device that is not associated with the IPM session.

* * * * *